US012663586B2

(12) United States Patent
Ginis et al.

(10) Patent No.: US 12,663,586 B2
(45) Date of Patent: Jun. 23, 2026

(54) ELECTROMAGNETIC WAVEGUIDES USING CASCADED MODE CONVERSION

(71) Applicant: PRESIDENT AND FELLOWS OF HARVARD COLLEGE, Cambridge, MA (US)

(72) Inventors: Vincent Ginis, Cambridge, MA (US); Marco Piccardo, Cambridge, MA (US); Michele Tamagnone, Cambridge, MA (US); Federico Capasso, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 421 days.

(21) Appl. No.: 18/013,539

(22) PCT Filed: Jul. 1, 2021

(86) PCT No.: PCT/US2021/040195
§ 371 (c)(1),
(2) Date: Dec. 28, 2022

(87) PCT Pub. No.: WO2022/051021
PCT Pub. Date: Mar. 10, 2022

(65) Prior Publication Data
US 2023/0324612 A1 Oct. 12, 2023

Related U.S. Application Data

(60) Provisional application No. 63/047,572, filed on Jul. 2, 2020.

(51) Int. Cl.
*G02B 6/14* (2006.01)

(52) U.S. Cl.
CPC ..................................... *G02B 6/14* (2013.01)

(58) Field of Classification Search
CPC ....................................................... G02B 6/14
(Continued)

(56) References Cited

U.S. PATENT DOCUMENTS 5,103,491 A 4/1992 Kuzuta
7,283,701 B2 10/2007 Hallemeier et al.
(Continued)

FOREIGN PATENT DOCUMENTS

JP 4447570 B2 * 4/2010

OTHER PUBLICATIONS

International Search Report and Written Opinion for International Patent Application No. PCT/US2021/040195, mailed Mar. 21, 2022, 6 pages.
(Continued)

*Primary Examiner* — Kaveh C Kianni
(74) *Attorney, Agent, or Firm* — FOLEY & LARDNER LLP

(57) ABSTRACT

A device includes a first mode converter and a second mode converter that define a region between the first mode converter and the second mode converter. The region can contain a plurality of optical modes including at least three modes. The first mode converter and the second mode converter can generate a near-field via a conversion between the plurality of optical modes. The first mode converter can receive an input wave of a first mode and the second mode converter can generate an output wave of a second mode different from the first mode. The first mode converter and the second mode converter can generate a confined near-field via a conversion between the plurality of optical modes.

10 Claims, 20 Drawing Sheets

(58) Field of Classification Search
     USPC .......................................................... 385/28
     See application file for complete search history.

(56)                   References Cited

U.S. PATENT DOCUMENTS

| | | | |
|---|---|---|---|
| 9,786,314 B1 * | 10/2017 | Peng | G02B 6/14 |
| 10,234,627 B1 | 3/2019 | Kojima et al. | |
| 2008/0211727 A1 * | 9/2008 | Elmore | H01P 3/10 |
| | | | 343/773 |
| 2009/0041410 A1 | 2/2009 | De Barros et al. | |
| 2010/0290323 A1 | 11/2010 | Isogai et al. | |
| 2011/0080579 A1 * | 4/2011 | Pipino | G01N 21/65 |
| | | | 356/301 |
| 2013/0294468 A1 * | 11/2013 | Sridharan | H01S 3/10053 |
| | | | 372/29.02 |
| 2017/0123291 A1 * | 5/2017 | Vampa | G02F 1/3556 |
| 2018/0088275 A1 | 3/2018 | Okayama | |
| 2018/0211685 A1 * | 7/2018 | Mehfuz | G02B 6/14 |
| 2021/0325241 A1 * | 10/2021 | Ohodnicki | G02B 6/241 |
| 2024/0302207 A1 * | 9/2024 | Ohodnicki | G01J 5/28 |

OTHER PUBLICATIONS

Piccardo et al., "Roadmap on multimode light shaping" Journal of Optics, Dec. 16, 2021 24(013001):1, 21-24.

* cited by examiner

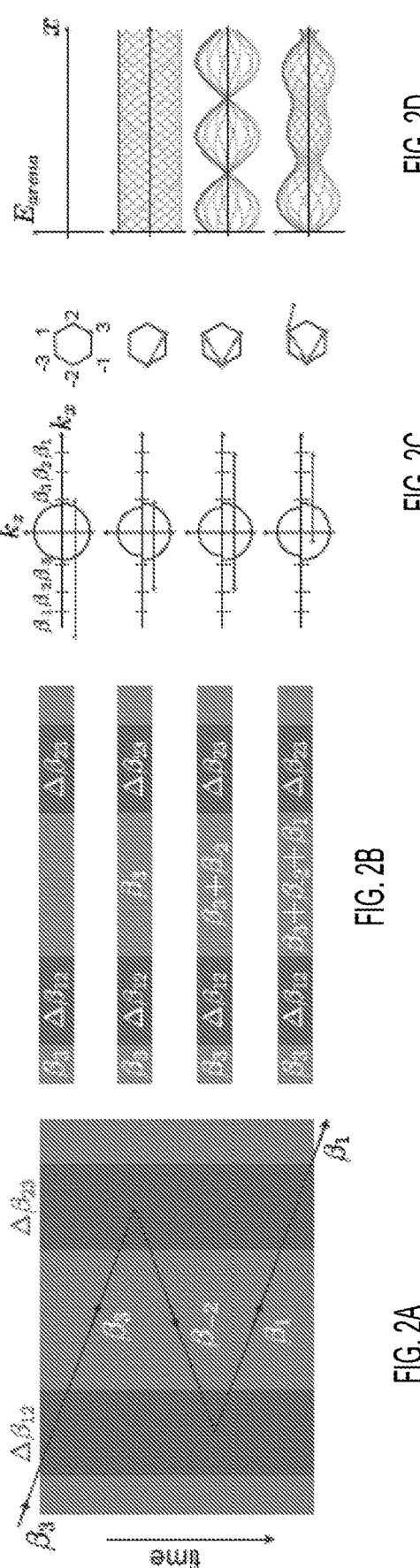

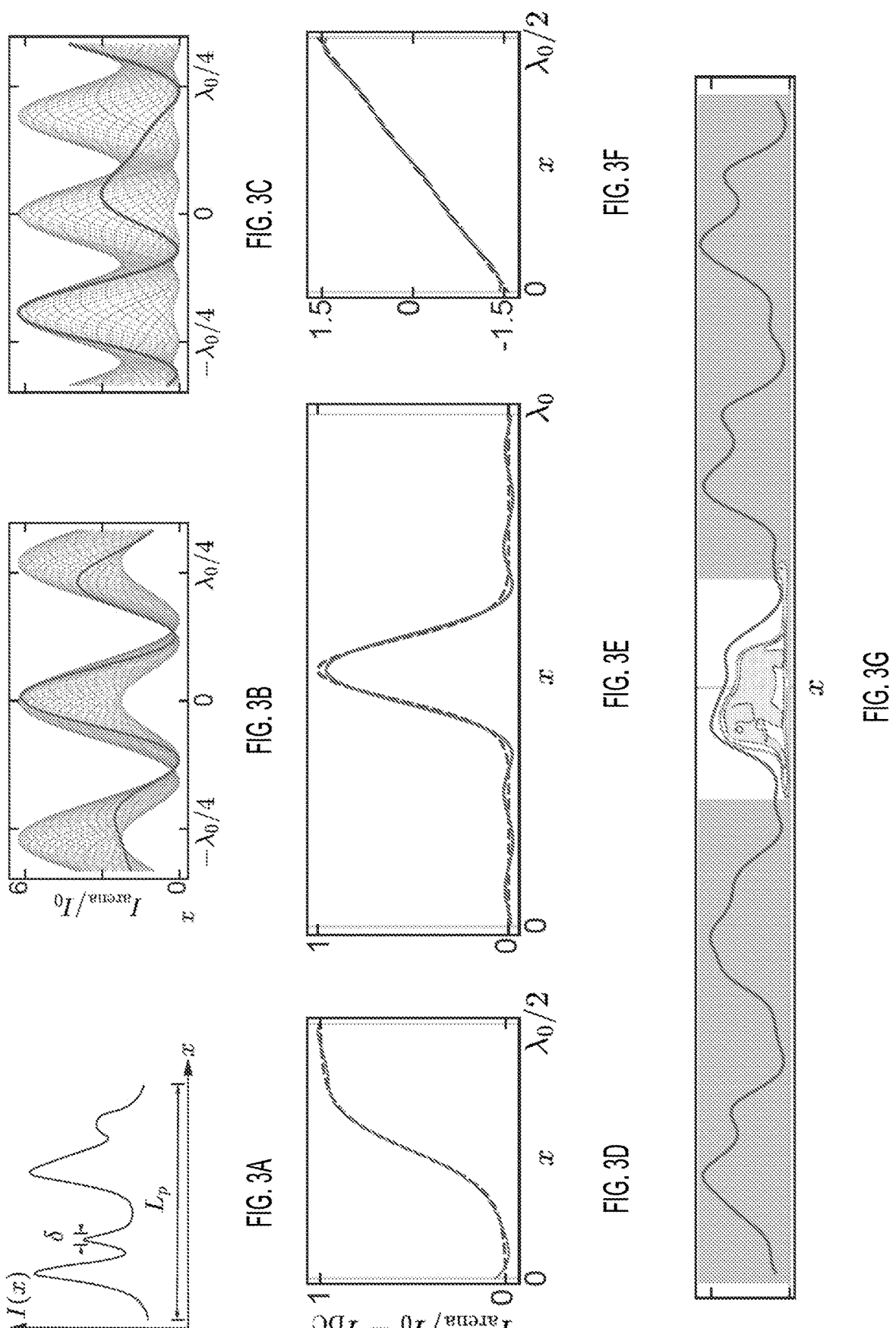

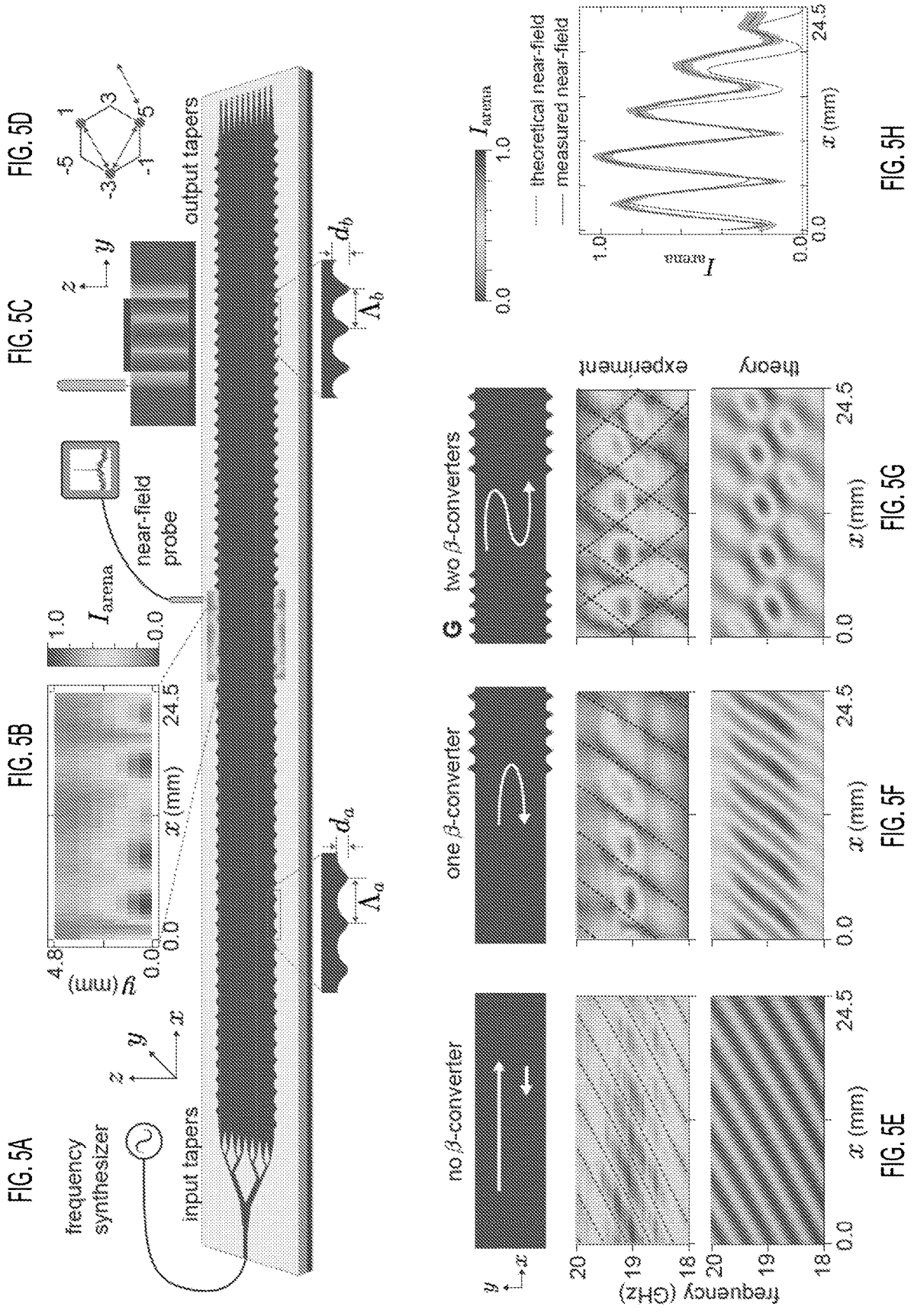

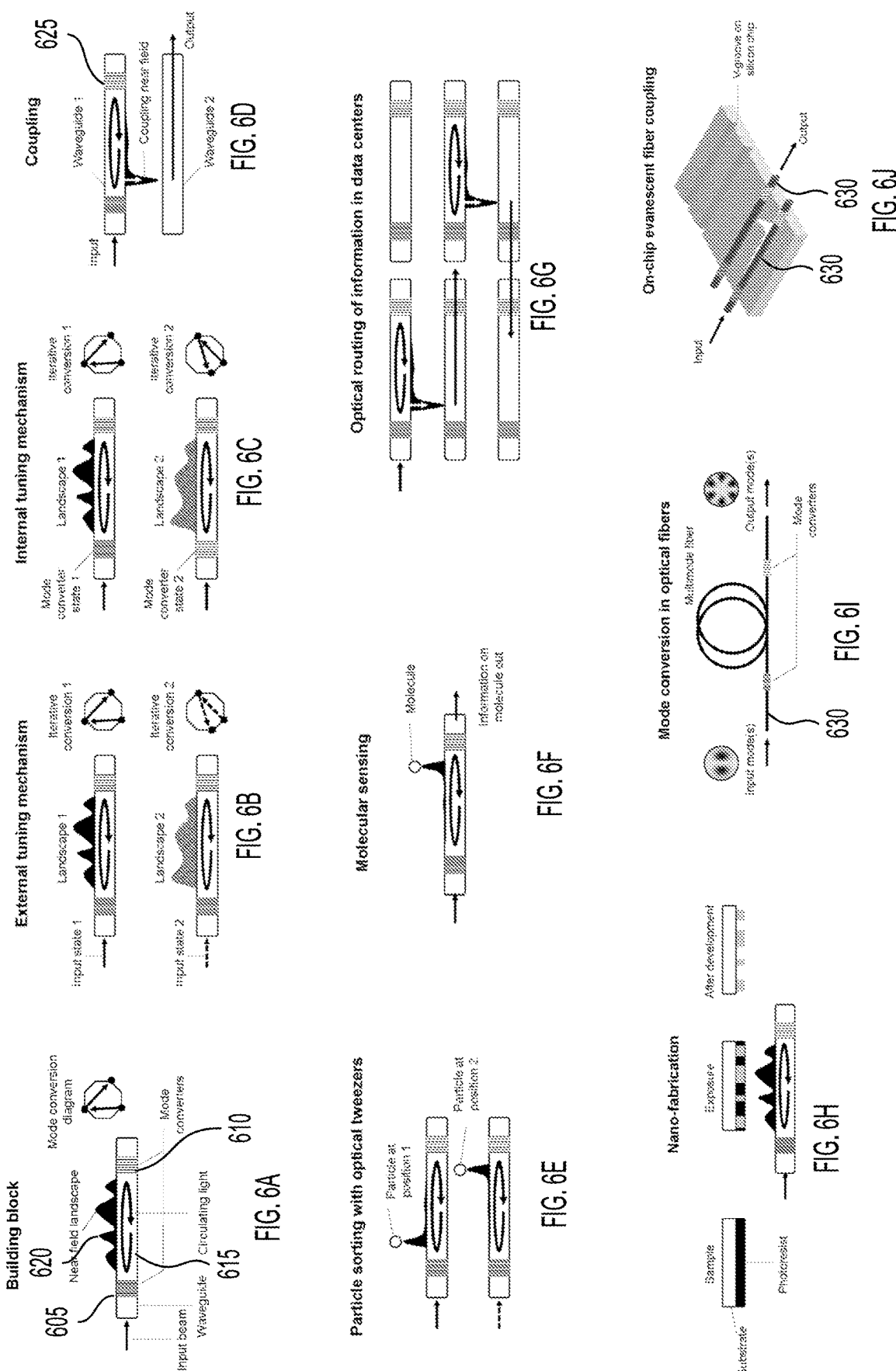

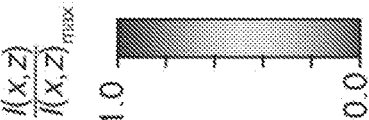
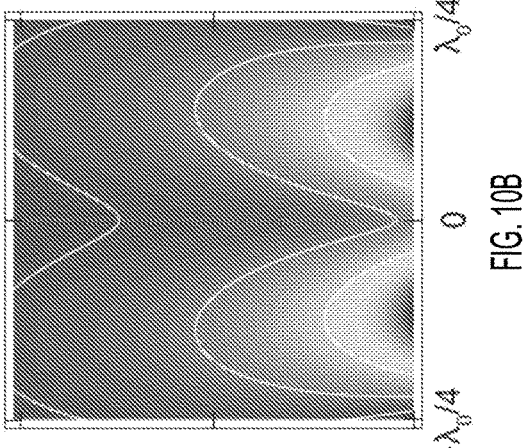
FIG. 10A
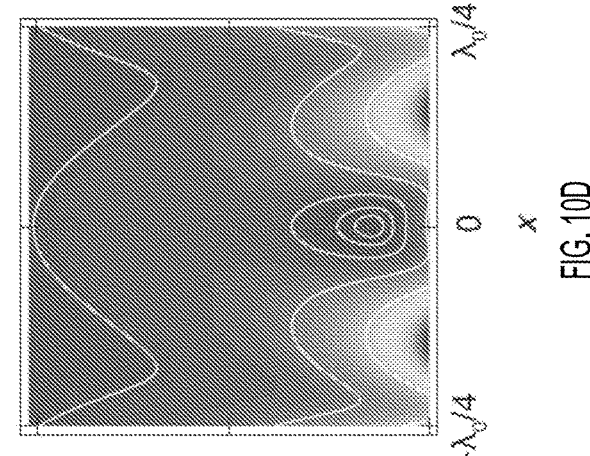
FIG. 10B
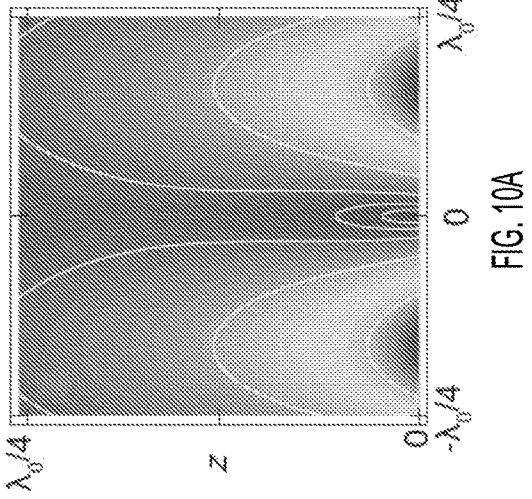
FIG. 10C
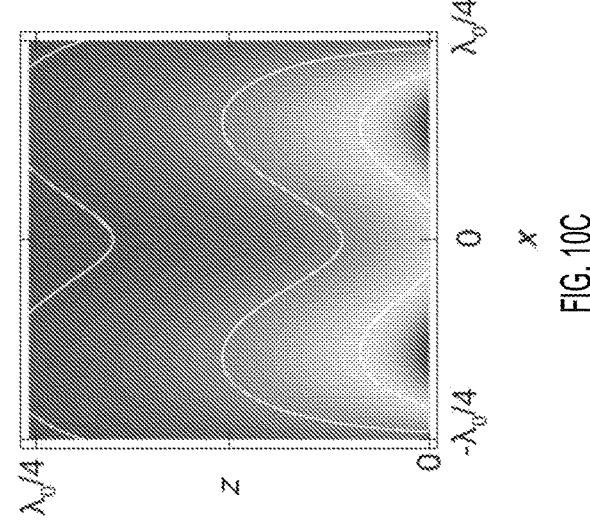
FIG. 10D

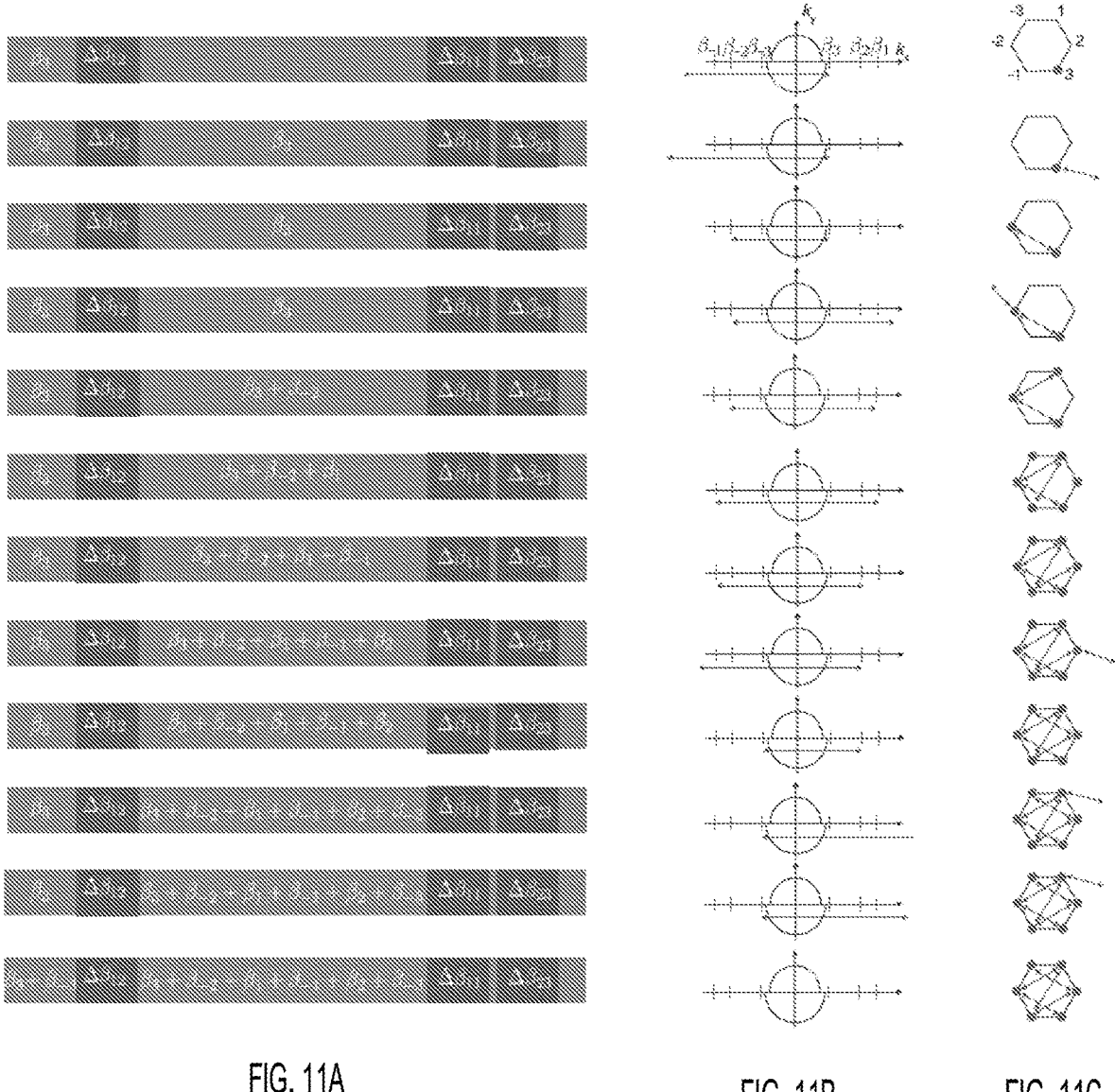
FIG. 11A                    FIG. 11B        FIG. 11C

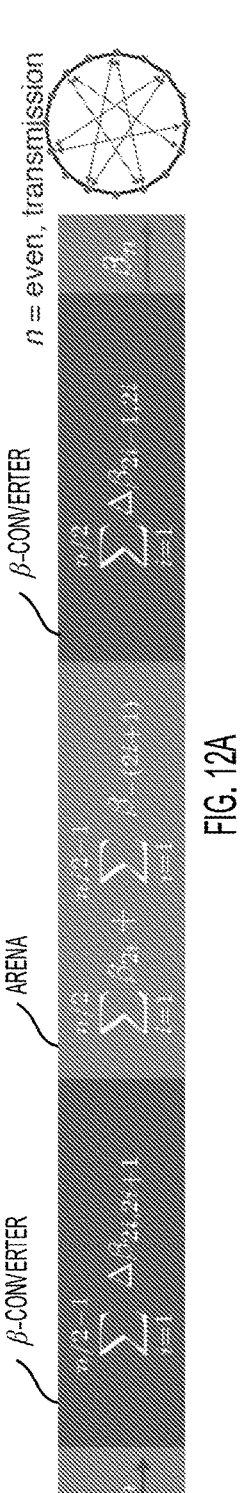
FIG. 12A
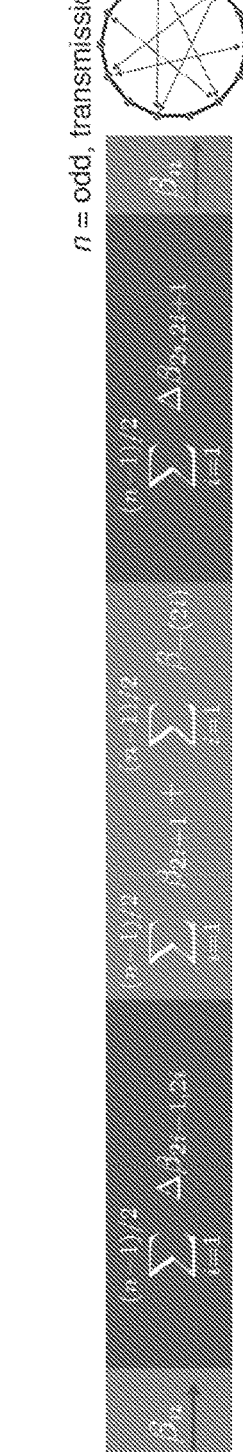
FIG. 12B
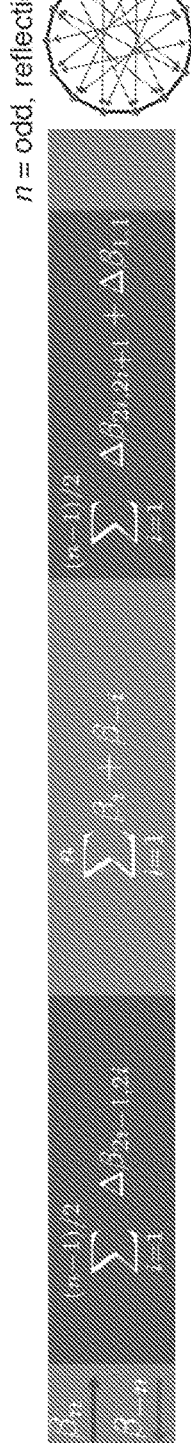
FIG. 12C
FIG. 12D

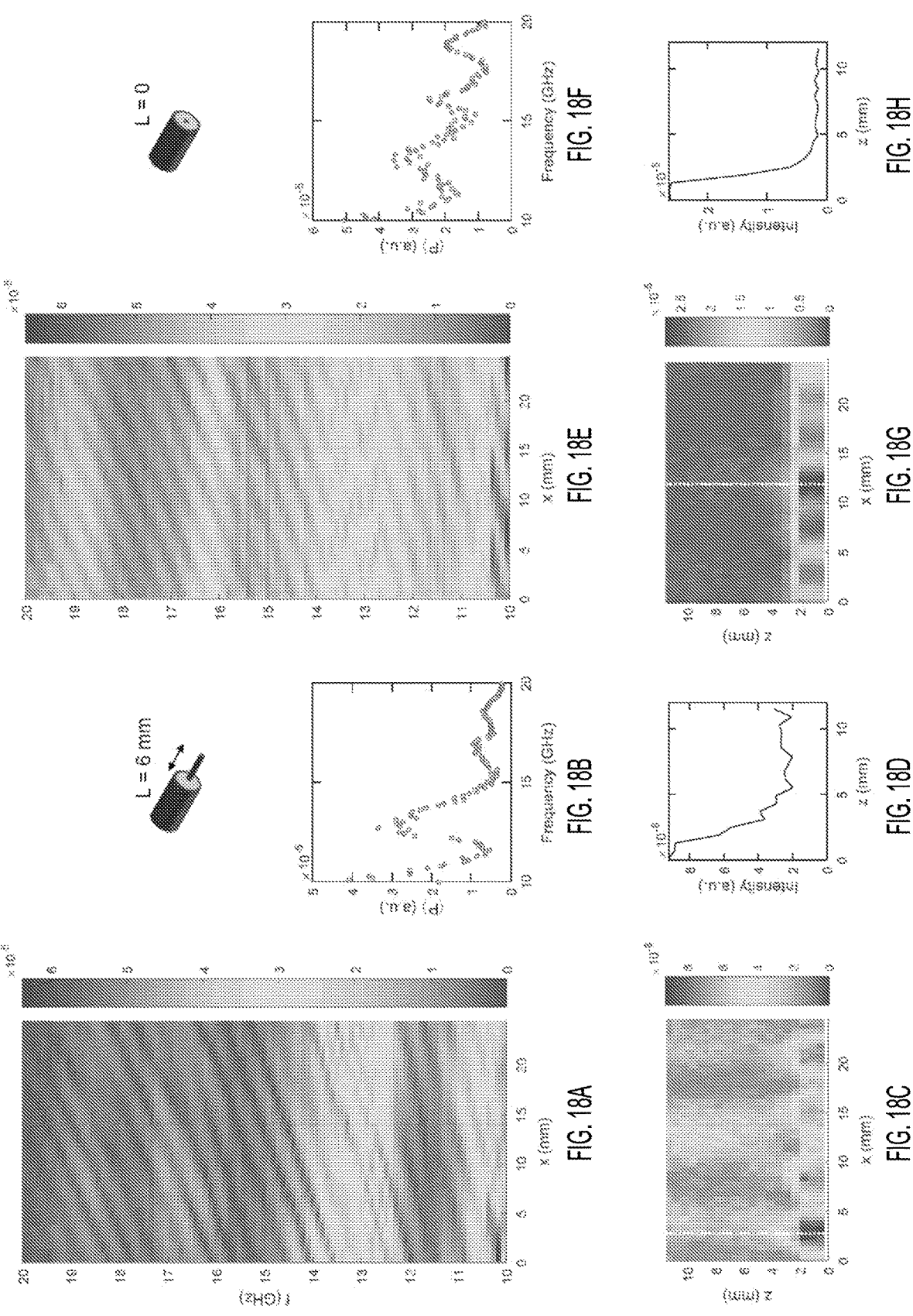

DESIGN FREQUENCY

ELECTROMAGNETIC WAVEGUIDES USING CASCADED MODE CONVERSION

CROSS-REFERENCE TO RELATED APPLICATIONS

The present application is a National Stage Entry of International Application No. PCT/US2021/040195, filed on Jul. 1, 2021, which claims the benefit of and priority to U.S. Provisional Patent Application No. 63/047,572, filed Jul. 2, 2020. The contents of which are hereby incorporated by reference in their entirety.

GOVERNMENT RIGHTS

This invention was made with government support under FA9550-14-1-0389 awarded by the Air Force Office of Scientific Research. The government has certain rights in the invention.

TECHNICAL FIELD

The present application relates generally to electromagnetic waveguides.

BACKGROUND

The near-field of confined modes can be found in a region of a waveguide.

SUMMARY

The electromagnetic near-field can enable subwavelength applications such as near-field microscopy and nanoparticle manipulation. The near-field can include a region of the electromagnetic field around an object where the propagation of electromagnetic waves is interfered with. Present methods to structure the near-field can rely on optical antenna theory, involving nanostructures that locally convert propagating waves into confined near-field patterns. The systems and methods of the present disclosure can relate to a theory of remote rather than local near-field shaping based on cascaded mode conversion and interference of counter-propagating guided waves with different propagation constants. Structuring the longitudinal and transverse variation of the near-field, allowing for distributions beyond the conventional monotonic decay of the evanescent field, is disclosed. The systems and methods of the present disclosure can apply to fields with arbitrary polarization states and mode profiles, providing a new path towards unprecedented three-dimensional control of the near-field. The systems and methods of the present disclosure relate to counterpropagating guided light waves using cascaded mode conversion. This can be used to engineer, control, or configure landscapes of localized light.

At least one aspect of the present disclosure is directed to a device. The device can include a first mode converter and a second mode converter that define a region between the first mode converter and the second mode converter. The region can contain a plurality of optical modes comprising at least three modes. The first mode converter and the second mode converter can generate a near-field via a conversion between the plurality of optical modes.

Another aspect of the present disclosure is directed to a device. The device can include a first mode converter configured to receive an input wave of a first mode. The device can include a second mode converter configured to generate an output wave of a second mode different from the first mode. The first mode converter and the second mode converter can define a region between the first mode converter and the second mode converter. The region can contain a plurality of optical modes comprising at least three modes. The first mode converter and the second mode converter can generate a confined near-field via a conversion between the plurality of optical modes.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 2A-2D illustrate schematics of step-by-step roundtrip mechanism in four consecutive steps, according to an embodiment.

FIGS. 3A-3G illustrate schematics of longitudinal landscapes generated with the near-field theory, according to an embodiment.

FIGS. 5A-5H illustrate schematics of measurements of a near field landscape.

FIGS. 6A-6J illustrate a general class of electromagnetic waveguides using cascade mode conversion and mode conversion in optical fibers, according to an embodiment.

FIGS. 10A-10D illustrate the creation of an isolated intensity minimum away from the interface, according to an embodiment.

FIGS. 11A-11C illustrate schematics of a step-by-step roundtrip excitation of all modes of a three-mode waveguide, propagating in both directions, using a single incident mode and three mode converters, according to an embodiment.

FIGS. 12A-12D illustrate different configurations of the $\beta$-converters that excite all modes in the arena, according to an embodiment.

FIGS. 18A-18H illustrate the characterization of the effect of a protruding conductor in a near-field scanning microwave probe, according to an embodiment.

Like reference numbers and designations in the various drawings indicate like elements.

DETAILED DESCRIPTION

Figures 1A, 1B, 1C, 1D:
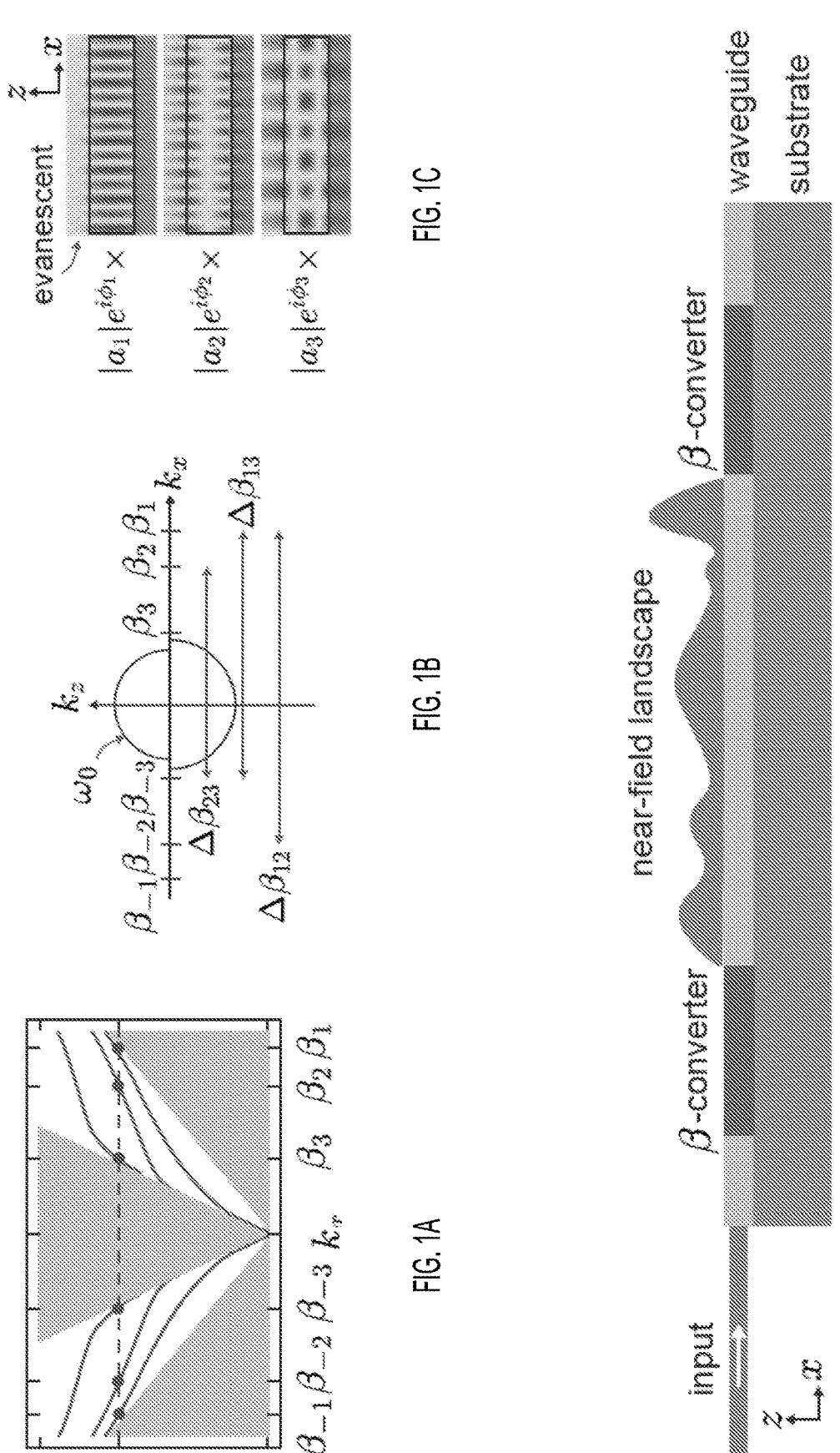
FIGS. 1A-1D illustrate schematics of remote near-field engineering using $\beta$-converters, according to an embodiment.

Following below are more detailed descriptions of various concepts related to, and implementations of, methods, apparatuses, and systems for counterpropagating guided light waves using cascaded mode conversion. The various concepts introduced above and discussed in greater detail below may be implemented in any of a number of ways, as the described concepts are not limited to any particular manner of implementation. Examples of specific implementations and applications are provided primarily for illustrative purposes.

The systems and methods of the present disclosure relate to the concept of remote control of the near field of electromagnetic waves. The methods to manipulate the near field and the far field can be conceptually different. The structuring of the near field can rely on antenna theory, involving dielectric or plasmonic nanostructures that locally convert free-space propagating beams into confined near-field radiation patterns. As a result, the near field can be structured in the vicinity of antennas. This limitation can prevent the advanced manipulation of the near field and applications where small feature sizes or good confinement are useful, such as near-field microscopy, sensing, and particle manipulation. A theory that allows for the shaping of the near field using remote wave-interference is disclosed. The physical concept for shaping of the near field can be based on successive reflections of guided waves while converting the propagation constants. Structuring the longitudinal and transverse variation of the near field can allow for distributions beyond the monotonic decay of the evanescent field. An experimental realization that confirms the theory is provided by fabricating a microwave waveguide that generates a structured near-field landscape. The near-field landscape is characterized by using a near-field scanning probe measurement. The systems and methods of the present disclosure can be applied to fields with multiple polarization states, frequencies, and higher-order spatial mode profiles. This provides a new path towards unprecedented three-dimensional control over the properties of the electromagnetic near field.

Despite their intrinsic three-dimensional nature, electromagnetic waves can be efficiently guided on one or two-dimensional structures. Guided modes (e.g., modes, optical modes, etc.) can include solutions of Maxwell's equations in which the energy of the field is propagating exclusively inside a confining structure (e.g., a waveguide, an optical fiber, etc.). The region surrounding the waveguide can include a non-negligible field (e.g., the near field of confined modes). In the direction perpendicular to the waveguide, this field can decay exponentially. The field may not carry any energy away from the waveguide.

The near field of guided waves has particular properties. Increased resolution can be obtained with near-field imaging. Devices using the near-field can include near-field scanning optical microscopes. Other applications include near-field sensing, nonradiative energy transfer, and the manipulation of particles using near-field optical forces. The near field can exert a counterintuitive force on a micropartice. Another example of a near-field phenomenon can include tunneling of light between coupled waveguides. This can be useful in the context of interferometry, quantum optics, optical computing, and telecommunications.

Techniques to structure and enhance this field can use a perspective based on classical antenna theory, where dielectric or plasmonic scatterers convert propagating waves into localized near field radiation patterns. The design techniques of far-field radiation patterns can rely on the interference of waves with different spatial frequencies and often use simple geometric principles. Examples of analytical techniques that allow for the design of materials that generate a predetermined distribution of light at a distance can include the principle of Fermat, optical holography, conformal mapping, and transformation optics. The design of complex imaging systems, lasers, resonators, and general beam manipulators can include these techniques. The field of structured light can include the creation of custom light fields with structured intensity, polarization, and phase. The systems and methods of the present disclosure can include an analytical formalism to remotely control near-field distributions.

The structuring of the near-field can be based on the interference of many counterpropagating guided waves with different propagation constants. Because the electromagnetic field in waveguides is confined in the transverse dimension, there can be a discretization of the propagation constants, creating a discrete set of guided modes. $\beta$ can refer to the longitudinal component of the guided mode wavevector ($\beta=k_0 n_{eff}$, where $k_0$ is the free space wavevector and $n_{eff}$ the effective mode index).

FIGS. 1A-1D illustrate schematics of remote near-field engineering using $\beta$-converters (e.g., mode converters). FIG. 1A illustrates the dispersion relation of a waveguide showing the discrete set of modes with in-plane propagation constants $k_x$ that can exist (dots) at a fixed frequency (dashed line). FIG. 1B illustrates the modes at $\omega_0$ in the $(k_x, k_z)$-plane, where the semi-circles represent the dispersion relations of the surrounding media. In this reciprocal space, $\beta$-converters can correspond to vectors that bridge the distance between a specific pair of counter-propagating modes with different mode indices. FIG. 1C illustrates that by controlling, independently, the amplitude $|a_i|$ and phase $\varphi_i$ of each of the guided modes, near-field spatial profiles can be created. The $(x, z)$ cross section of the fundamental, the second, and the third guided mode is shown. FIG. 1D illustrates a schematic of a near-field landscape device. A single mode at the input of a multimode waveguide can iteratively interact with two $\beta$-converters and generate a set of guided modes with different complex amplitudes, generating a near-field landscape. The set of guide modes can bounce back and forth between the two $\beta$-converters.

The region of interest (e.g., arena, region, etc.) can be delineated by two mode-converters. One guided mode can enter the arena on one side and can interact with the mode converter on the other side. This process can generate a different counterpropagating mode, which in turn interacts with the leftmost mode-converter. The cascaded interaction between the newly generated modes and the mode-converters can create a sum of many guided waves (FIG. 1C). The physical properties of the converters can determine the phase and amplitude of the guided modes in the arena. If the waveguide supports a sufficient number of modes, this process can allow for the creation of a near-arbitrary near-field landscape above the arena.

Because of the discrete nature of the confined modes and the specific spacing of the longitudinal wavevectors (FIG. 1A), it can be possible to design reflectors that convert one particular mode into another while leaving the other modes virtually unaffected. Indeed, in reciprocal space, a mode converter can be pictured as imparting a vector that matches the difference between the propagation constants of two counterpropagating modes of interest (FIG. 1). When the sum of the longitudinal wavevectors of an incident mode and the reciprocal lattice vector associated with the mode-converter equals the propagation constant of a reflected mode, a mode conversion can take place. However, when this sum does not coincide with the longitudinal wavevector of another mode, the incident mode can be transmitted almost unhindered, except for a certain phase shift.

FIGS. 2A-2D illustrate schematics of a step-by-step roundtrip mechanism in four consecutive steps (top to bottom). The interactions can be visualized in physical space (FIG. 2A-2B) and reciprocal space (FIG. 2C). Also shown are compact diagrams representing the mode conversion as a path on a polygon where each vertex corresponds to a different guided mode. FIG. 2D illustrates the evanescent near-field that can be generated at the interface in the arena. FIGS. 2A-2D illustrates the mechanism for a three-mode waveguide with incoming mode $\beta_3$. The incident wave can interact minimally with the first reflector. The sum of the reciprocal lattice vector of the $\beta$-converter and the propagation constant of the incident mode ($\beta_3$) can have no overlap with any mode. The incident wave can be transmitted with an extra phase shift. The second mode-converter can reflect that mode $\beta_3$ back into the mode with wavevector $-\beta_2$. This wave, in turn, can interact with the first reflector, reflecting it into the mode with momentum $\beta_1$. The two $\beta$-converters to the left and the right of the arena in FIGS. 2A and 2B can provide reciprocal lattice vectors that match $\Delta\beta_{12}$ and $\Delta\beta_{23}$, respectively. This principle can be generalized to configurations with other incident modes and systems with more than three modes. While making a cycle in reciprocal space, the method can generate a superposition of three different modes in between both mode-converters, as visualized in FIG. 2D.

In the case of the three-mode system with fixed polarization, the total electric near field above the surface of the arena can be given by $E_{arena}=E_0\{\exp(i\beta_3x)+r_1 \exp[-i(\beta_2x+\phi_1)]+r_1r_2 \exp[i(\beta_1x+\phi_1+\phi_2)]\}$, where $E_0$ is the amplitude of the incident mode. This can be generalized to an arbitrary number of modes N as $$\frac{E_{arena}}{E_0} = \sum_{i=1}^{N}\left(\prod_{j=0}^{i-1}r_j\right)\exp\left[i\left(\beta_ix + \sum_{j=0}^{i-1}\phi_j\right)\right], \qquad (1)$$

where $\{r_j\}$ are the reflection coefficients of the different mode-converters, and $\{\phi_i\}$ and $\{\beta_i\}$ are the phases and the longitudinal wavevectors of the modes propagating in the system, in the order in which the modes are generated ($r_0$ and $\phi_0$ conveniently set equal to 1 and 0). The phases can depend on the physical implementation details as well as the location of the reflectors. The interaction between a mode and a non-interacting mode-converter can also contribute to these phases. The reflection coefficients can be determined by the mode-conversion efficiency of the reflectors and the differences between the field strength of the different modes at the interface.

While the amplitude of the near field can oscillate at high frequencies, its envelope or the intensity can remain constant as a function of time (FIG. 2D). The time-independent, spatial variation of the near-field intensity is given by $$\frac{I_{arena}}{I_0} = \sum_{i=1}^{N}\left(\prod_{j=0}^{i-1}r_j^2\right) + 2\sum_{l=2}^{N}\sum_{m=1}^{l-1}\left(\prod_{p=0}^{l-1}r_p\prod_{q=0}^{m-1}r_q\cos\left[(\beta_l - \beta_m)x - \sum_{r=l}^{m}\phi_r\right]\right), \qquad (2)$$

The structure can resemble a guided wave resonator with reflectors on both sides of the arena. A few counterintuitive properties can arise because of the mode-conversion that takes place at each reflection. Some typical characteristics of the electromagnetic field inside a resonator do not apply here.

For example, the field amplitude, which can be given by Eq. (1), may not follow the temporal evolution of a standing wave with fixed nodes and anti-nodes. Although the envelope of the field can remain constant, the location of the field's maximum and minimum continuously varies as a function of time.

The constant term in Eq. (2) can show that the near-field intensity can be enhanced inside the arena. This enhancement can be proportional not only to the reflection coefficients ($r_j$) but also to the number of $\beta$-conversions. The field can be enhanced without using a resonator. The field can oscillate back and forth, each time in a different mode, and the intensity in the arena can increase. However, a round-trip phase condition does not need to be satisfied, which can have two implications. First, the distance between the mode-converters can be made smaller than the length of a traditional resonator, which typically must be larger than half of the wavelength. Second, there may not be a trade-off between field enhancement and bandwidth, as can be the case with a conventional resonator. The number of available guided modes can be the only factor limiting field enhancement in the arena.

The second term in Eq. (2) can encode the spatial variation of intensity inside the arena: a sum of cosines of all possible difference frequencies of the guided modes that propagate between both reflectors. The intensity can depend on the different frequencies. The number of spatial frequencies in the intensity profile can grow in a nonlinear manner with the number of propagating modes N:

$$\sum_{l=2}^{N}\sum_{m=1}^{l-1}1 = (N^2 - N)/2.$$

There can be a large dynamic range of spatial frequencies: the counterpropagating modes can generate large spatial frequencies, while the copropagating modes can combine into cosines with small spatial frequencies. These characteristics can ensure that the near-field intensity profiles have a large periodicity $L_p$, given by the inverse of the greatest common divisor (gcd) of the spatial difference frequencies ($L_p=2\pi/\text{gcd}(K_i)$), in combination with a small feature size $\delta$, roughly twice the inverse of the largest guided wavevector ($\delta\approx\pi/\max(k_i)$), as shown in FIG. 3A.

FIGS. 3A-3G illustrate schematics of longitudinal landscapes generated with the near-field theory. FIG. 3A illustrates the intensity profile of the near field in the arena containing many spatial frequencies, large and small, thus it can exhibit a very large periodicity ($L_p$) in combination with small feature sizes ($\delta$). FIGS. 3B and 3C illustrate that in a system with three different modes ($n_{eff,1}$=3, $n_{eff,2}$=2.2, $n_{eff,3}$=1.5), a multitude of spatial intensity profiles can be generated. Each curve can show the near field that is generated in a different physical implementation (32 in total), where the amplitude of the reflection coefficients is held constant ($r_{12}$=1, $r_{23}$=0.5), while the phase of the reflections varies: $\phi_{12} \in$ [0, $2\pi$], $\phi_{23}$=0 in (B), and $\phi_{12}$=0, $\phi_{23} \in$ [0, $2\pi$] in FIG. 3C. Each landscape can feature different peaks without periodicity, as shown by the highlighted near fields of two specific implementations (thick lines). FIGS. 3D-3G illustrate that with only a few free parameters, the near-field landscape (corresponding to the spatially varying term in Eq. 2) can be fitted to a large class of predetermined functions (dashed lines), such as: (FIG. 3D) a sigmoid; (FIG. 3E) a Gaussian; (FIG. 3F) a straight line; (FIG. 3G) an elephant shape. All these examples can be reconstructed in a four-mode system ($n_{eff,1}$=3.36, $n_{eff,2}$=20.6, $n_{eff,3}$=1.9, $n_{eff,4}$=1.1).

FIGS. 3B and 3C illustrate the types of profiles that can be obtained in a three-mode system. Thirty two different implementations can be simulated, keeping the reflection amplitudes of the converter constant while varying the reflection phases of both $\beta$-converters. These near fields can contain localized spots, the position and magnitude of which can change as a function of the value of one physical parameter. Such intensity distributions can have applications in the context of particle manipulation or mode switching. The full potential of this structure, however, can lie in its ability to generate near-arbitrary near-field profiles.

The second term in Eq. (2) has similarities with a Fourier series. However, the contributing frequencies that determine the spatial intensity profile are not equidistant. They are a set of difference frequencies ($k_i-k_j$). Similar to a standard Fourier series, many spatial profiles can be approximated arbitrarily well by the sum of cosines, shown in Eq. (2). To demonstrate the potential of this approach, the reflection coefficients—both amplitude and phase—that yield the best possible fit of a target landscape can be calculated. In FIGS. 3D-3F, the optimal decompositions of a sigmoid function, a bell curve, and a straight line are shown. These spatially varying near-field landscapes can be constructed as a sum of the first four modes in a traditional SOI-waveguide (V−number=14).

These profiles can be reconstructed in the region above the waveguide. There can be no evanescent decay in these profiles because the landscapes are shown at a fixed height above the surface. When looking at distances further away from the interface, the intensity can decrease exponentially. The shape of the landscape can change because of the different decay constants of the guided modes. However, it is possible to incorporate the different decay constants into the model and design the landscape at a specific distance away from the interface.

A few guided modes can generate a rich range of near-field profiles. FIG. 3G illustrates a near-field landscape shaped like an elephant using only four modes. The periodicity of the signals, determined by Eq. (2), can be greater than the length of the region where the specific field distribution is located. By choosing a small area length compared to $L_p$, a small part of a more extended signal can be extracted by correctly designing the position of the $\beta$-converters and the phase of the reflected modes.

The theory can not only be used to design the field profile along the propagation direction. Transverse near-field profiles (e.g., in the direction perpendicular to the interface) can also be synthesized. Modes with different propagation constants $\beta_i$ can have different decay constants $$\gamma_i = \sqrt{k_0^2 - \beta_i^2}.$$

As a result, different interference patterns at different heights above the interface can be generated. The intensity of the field does not have to be a monotonously descending function, starting from the interface. The interference of several evanescent fields may grow to a maximum before the field starts to descend.

Figure 4A:
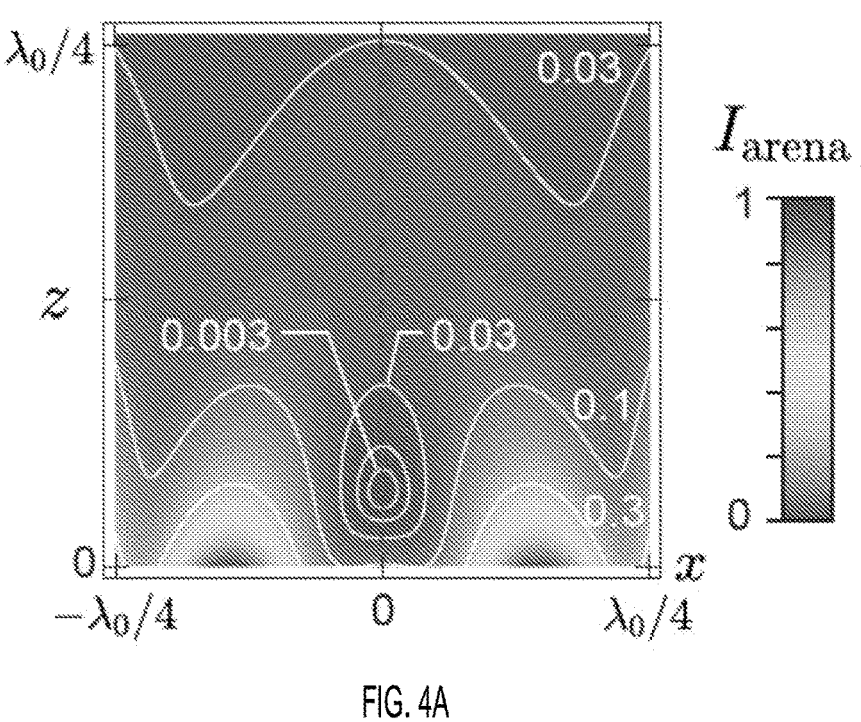
FIGS. 4A-4E illustrate schematics of designing the transverse variation of the near field, perpendicular to the propagation direction of the waveguide modes, according to an embodiment.
Figure 4B:
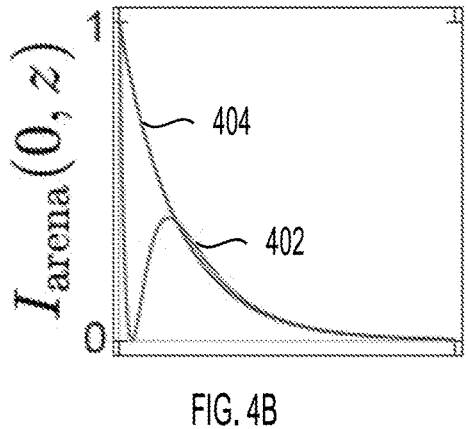
Figure 4C:
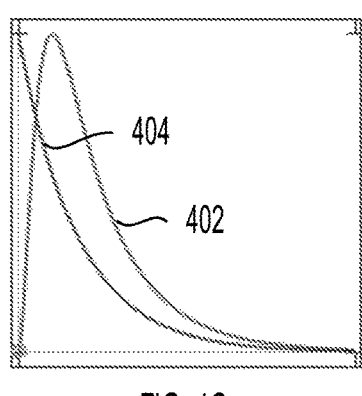
Figure 4D:
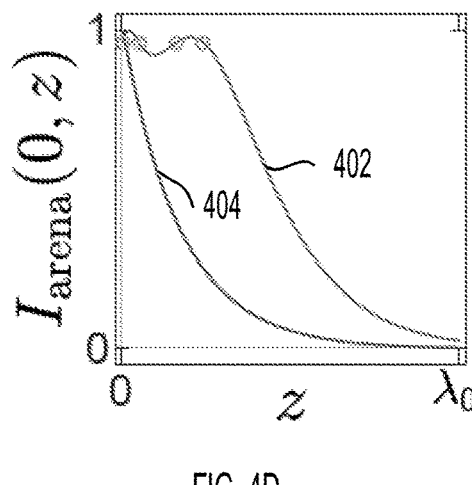
Figure 4E:
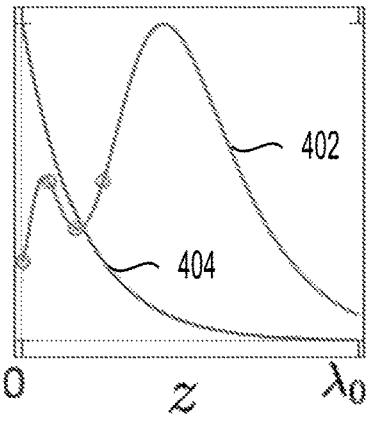

FIGS. 4A-4E illustrate schematics of designing the transverse variation of the near field, perpendicular to the propagation direction of the waveguide modes. Specific transverse variations of the near-field intensity can be designed by interfering evanescent waves with different decay constants $\gamma_i$. FIG. 4A illustrates an (x,z)-density plot of a specific near-field intensity illustrates a non-monotonic decay of the near field in the transverse direction at x=0 pointing away from the surface of the waveguide. By combining several modes with specific amplitudes, an isolated intensity minimum can be constructed above the interface. FIG. 4B illustrates a cross section of the field shown in FIG. 4A at x=0 (dashed line), highlighting the transverse profile of the evanescent field 402. The fundamental mode 404 is shown. FIGS. 4C-4E illustrate other structured, transverse near-field profiles exhibiting an intensity node at the interface (FIG. 4C), an intensity plateau (FIG. 4D), and an oscillatory intensity profile (FIG. 4E). The amplitudes of the modes can be determined by an algorithm that fits the near-field intensity to target intensities, indicated by the circles. In each of these plots, the structured fields can be normalized at the interface, and the lines show the cross section of the fundamental mode 404. The structured near fields can be calculated using a combination of the first five modes of a symmetric slab silicon-on-insulator waveguide (V−number=18).

In the transverse direction, there can be less freedom to reconstruct an arbitrary profile, because modes can decay exponentially in the direction away from the interface. An algebraic technique can be implemented that allows for the design of some transverse landscapes. For a fixed x-coordinate, the intensity at different heights can be set to predetermined values I(x, z). The amplitudes and phases of the different modes can then be found as a solution to a set of coupled equations. Once these parameters are known, $\beta$-converters can be designed that excite the counterpropagating modes with the correct (e.g., target) amplitudes. FIG. 4B illustrates a comparison of the intensity profile of an evanescent wave and the intensity profile of a structured near field, with an intensity minimum at a small distance away from the interface. FIGS. 4C-4E illustrate the profiles of several structured near fields, respectively corresponding to an intensity profile with a node at the interface (FIG. 4C), a plateau (FIG. 4D), and an oscillatory variation (FIG. 4E).

There can be subtle trade-offs that appear in the design of a transverse variation of the near field. The more deviation from a traditional exponential decay, the smaller the region (in the x-direction) where this variation can be observed. There can also be a trade-off in the intensity, closely related to the spatial trade-off: in the region where substantial non-monotonic changes are occurring, the intensity can increase to a fraction of the total intensity in the system. Both trade-offs are shown in FIG. 4A—a structured near-field at x=0 with a node just above the interface. First, the non-monotonic variation can disappear for smaller and larger values of x. Second, the intensity along the x=0 line can be an order of magnitude smaller than along x=λ/6. These two considerations can have a lot in common with the trade-offs that are typically associated with superoscillating functions.

In a first step, the near field can be designed based on geometric reasoning in reciprocal space. At a later stage, the way these reciprocal vectors are materialized can be designed. Different structures can be considered, such as lithographically applied gratings, refractive index variations, or variations in the thickness of a waveguide itself. On a physical level, each structure can implement a variation of the impedance. A variation with a periodicity d can correspond to a reciprocal vector of length $2\pi/d$. That vector can have a bandwidth inversely proportional to the length of the physical structures. These two arguments can allow for a first-order geometric design of reflectors that implement the right β-conversion. The periodicity of the impedance variation can be determined by the size of the jump in reciprocal space, whereas the minimal length of the physical structure can be determined by the desired selectivity, which can be related to the spacing between and the quality factor of the confined modes.

The amplitude and shape of the impedance variations can be the last parameter to be determined to implement the β-converter. A first-order approximation of the reflected field as a function of a continuous variation of the reflection coefficient r(x) can be derived. Assuming that secondary reflections within each β-converter can be ignored, this formula can be given by $$E_r(x, y = 0) = \int_{-\infty}^{+\infty} E(x')r(x')\ w(x')G(x - x')dx', \quad (3)$$

where a Green's function G(x) is introduced. The rectangle window function w(x), having a value of 1 over the extent of the reflector, can be used to rewrite the reflected field as a genuine convolution. To evaluate the reflected field in the reciprocal space, the Fourier transform of this equation can be taken. This can yield $$\tilde{E}_r(k_x) = \{\mathcal{F}[E(x)] \otimes \mathcal{F}[r(x)] \otimes \mathcal{F}[w(x)]\} \times \mathcal{F}[G(x)], \quad (4)$$

where $\mathcal{F}[E(x)] = \tilde{E}(k_x)$ is the Fourier transform of the electric field traveling through the structure. This field, which can be a sine wave at the incident spatial frequency, can be convoluted with the Fourier transform of the spatially varying reflection coefficient. This can be the mathematical foundation introducing the reciprocal vector related to any periodic impedance variation. However, the reflection coefficient r(x) can be a superposition of many different spatial frequencies. Multiple β-converting reflectors can thus be combined in the same structure.

Contrary to normal transmission or reflection gratings, impedance variations for guided waves may not directly correspond to refractive index variations. The ideal (e.g., target) shape of a refractive index optimizing the conversion efficiency for a single reflection can be derived. This variation can be given by $$n(x) = e^{-2\cos(x)}. \quad (5)$$

This can be the last element of the toolbox to design a β-converter. Combined with the waveguide theory, this can complete the procedure of translating a specific near-field landscape into a set of two β-converters.

To experimentally demonstrate the near-field landscape theory, a device that includes the mechanisms presented above can be realized. A near-field landscape that combines small feature sizes and large intensity variations that can be obtained with a three-mode system, as shown in FIGS. 3B and 3C. The scale invariance of Maxwell's equations can ensure that the principles disclosed herein can apply to electromagnetic waves of any frequency and the design method can work for any type of waveguide. Therefore, the experiment can be carried out at microwave frequencies without loss of generality. The device can include a multi-mode microstrip with an arena embedded into a pair of β-converters fabricated through a corrugation of the top metal layer as shown in FIG. 5A. The microstrip can be fed by a microwave synthesizer and utilize a collection of input tapers to inject the fundamental mode of the waveguide. The operation of these tapers can be based on a power division scheme. For example, an initial monomode microstrip can branch out and form multiple lines that distribute the electromagnetic power according to the sinusoidal profile of the fundamental mode of the waveguide ($\beta_1$). The corrugation period A and depth d of the two β-converters can be optimized by finite-difference time-domain simulations to ensure the chained mode conversion $\beta_1 \rightarrow \beta_{-3} \rightarrow \beta_5$ at the design frequency $f_0 = 19$ GHz. Modes of the same parity are used because of coupling constraints. The output tapers can absorb nearly all the power transmitted through the second β-converter ($\Delta\beta_{13}$) regardless of the mode order, which can minimize unwanted reflections in the region of interest. The design of these output tapers can be based on the parallel distribution of power to an array of impedance-matched high-frequency loads.

FIGS. 5A-5H illustrate schematics of measurements of a near field landscape. FIG. 5A illustrates a schematic of the device and characterization set-up. A multimode microstrip can be fed by a frequency synthesizer at 19 GHz. Two β-converters can be fabricated by corrugation of the top copper layer. FIG. 5B illustrates an example of a measured near-field. FIG. 5C illustrates a schematic cross-section of the microstrip illustrating the geometry in which the probe measures the near-field. A simulation of the third mode of the waveguide ($\beta_3$) is shown in a logarithmic scale. FIG. 5D illustrates a polygon diagram encoding the chained mode conversion. FIGS. 5E-5G illustrates experimental and theoretical maps in space-frequency domain of the near-field of three devices: a bare microstrip without converters (FIG. 5E), one with a single β-converter (FIG. 5F), and one with a pair of β-converters (FIG. 5G). The near-field signal can be characterized using a line scan on top of the dielectric in the longitudinal direction for a 2 GHz interval around the design frequency ($f_0 = 19$ GHz). The top figures of FIGS. 5E-5G illustrate a schematic of the top metal layer. The middle figures of FIGS. 5E-5G illustrate the experimental maps with superimposed analytical curves (dashed lines). The bottom figures of FIGS. 5E-5G illustrate the theoretical maps, obtained using a single parameter fit. The checker pattern observed in FIG. 5G can include a space-frequency signature of a full roundtrip in the arena via double mode conversion. FIG. 5H illustrates line cuts around $f_0$ of the experimental and theoretical maps for the device with two β-converters.

The interference among the different modes can shape a near-field landscape that is located on the side of the microwave waveguide as shown in FIGS. 5A and 5C, similarly to the fringing field of a capacitor. The landscape can be measured using near-field scanning microwave microscopy. Similarly to its optical counterpart, this technique can use a scanning probe placed nearby the sample to measure the surface field with a much higher resolution than the diffraction limit. Near-field scanning microwave microscopy can be employed in the characterization of passive and active microwave devices, including monomode microstrips. The set-up can use a coaxial probe sensitive to the vertical field $E_z$ with a subwavelength-sized inner conductor (ø=2.9 mm) in a truncated geometry optimized to achieve the best imaging performance. The power of the collected signal can be measured with a spectrum analyzer. FIG. 5B shows the measured near-field signal. In the x-direction, parallel to the mode propagation, multiple peaks with different intensities can be observed, corresponding to the wanted longitudinal landscape. In the perpendicular y-direction, the features can decay away from the waveguide, which can confirm the measurement of a near field.

The evolution of a single line scan along the x-direction as a function of the injected frequency in a small interval around the design frequency $f_0$ can be shown. Following an increasing order of complexity, the behavior of a simple control device without converters is shown in FIG. 5E. In this case, a periodic signal modulation in space at any frequency can be observed. This can be in agreement with a traditional standing wave, caused by the residual reflection at the output taper. The position of the nodes of these waves can describe hyperbolic curves in the space-frequency domain, which can form due to the interference of counter-propagating waves. The equation of the family of hyperbolas can be given by $$f_m(x) = m \frac{c}{n_{\mathit{eff},2} x_R \pm x(n_{\mathit{eff},1} + n_{\mathit{eff},2})}, \tag{6}$$

where $f_m$ is the frequency of a hyperbola of the family labeled by a positive integer m, c is the speed of light, $n_{\mathit{eff},1}$, $n_{\mathit{eff},2}$ are the effective indices of the two counter-propagating waves, $x_R$ is the position of the reflector, and x is the spatial coordinate preceded by a sign that depends on the reflector's position with respect to the region of interest. In the first control device, $n_{\mathit{eff},1} = n_{\mathit{eff},2}$ due to the absence of mode converters. From their period the effective index of the propagating mode can be obtained. The effective index of 1.706±0.036 can be in agreement with the theoretical value of the fundamental mode $n_{\mathit{eff},1} = 1.705$, while from the voltage standing wave ratio, the power reflection coefficient of the output tapers can be 1%. These measurements can confirm that the input and output tapers work as designed.

The behavior of a device embedding one β-converter is shown in FIG. 5F. Here again, a stripe pattern can appear, but the period and the tilt of the hyperbolas can change. This can imply that the two counter-propagating waves have different effective indices, signifying that mode conversion has occurred. The pattern can be reproduced from theory by using only one fit parameter, which is the phase of the reflector. The signal can be stronger around $f_0$ in the experiment, which can be attributed to a peak of mode conversion efficiency around the design frequency, while the analytical theory can assume a broadband conversion efficiency.

In the case of a device with two β-converters, a peculiar checker pattern is observed. The origin of this pattern can be understood as due to the intertwining of two families of hyperbolas—each appearing because of the reflection at one of the mode converters—which can define tiles in the space-frequency domain filled with near-field hotspots. This checker pattern can also be obtained from the theory using only one free parameter corresponding to the phase of the $\Delta\beta_{35}$ reflector. The reflection phase of the $\Delta\beta_{13}$ converter can be determined from the device with one β-converter, as discussed above. The agreement between experiments and theory can be highlighted by comparing a line cut of the space-frequency plots around $f_0$ as shown in FIG. 5H. These results can confirm that a full roundtrip via mode conversion in the arena is completed and a near-field landscape in agreement with the theory is created.

A geometric perspective can be used to design the near field at an interface. In this model, the area of interest may not contain any antennas. There can be substantial freedom in the design while the near field remains topologically confined to the interface. The examples of various longitudinal landscapes and non-monotonically decaying transverse variations can illustrate the power of this perspective.

Several free parameters can be added to expand the theory even further. Modes with higher transverse k-components can allow for the structuring of the near fields in the third (e.g., transversal) dimension. The combination of modes with different polarization states can be used to design nontrivial polarization and angular momentum near-fields. Nontrivial polarization and angular momentum near-fields can include near-fields where the polarization and the angular moment rapidly change as a function of space and/or time. These near-fields can include singularities. The nano-waveguides with effective indices that can be engineered or near-zero refractive index could be used to tune the overall bandwidth of the designed landscapes.

The landscapes can be varied dynamically. The landscape can be tuned using frequency switching as shown in FIGS. 5E-5H or polarization switching of the incident field. In addition, the waveguide or the β-converters can be embedded in a nonlinear material which can make the landscapes dynamically switchable with an external field. This technique can be useful in different fields in physics.

FIGS. 6A-6J illustrate a general class of electromagnetic waveguides using cascade mode conversion and mode conversion in optical fibers. FIG. 6A illustrates a device including a first mode converter 605 and a second mode converter 610 that define a region 615 (e.g., arena, region of interest, arena of interest, target region, central region, central region of interest, etc.) between the first mode converter 605 and the second mode converter 610. The region 615 can be configured to contain a plurality of optical modes (e.g., excitation modes, guided modes, guided modes, etc.) including at least three modes (e.g., three modes, five modes, ten modes, etc.). Confined modes can include the plurality of optical modes confined to the region 615. The plurality of optical modes can include a mode of an input wave, a mode of an output wave, and at least a third mode. The first mode converter 605 and the second mode converter 610 can be configured to generate a near-field via a conversion between the plurality of optical modes. A mode converter (e.g., first mode converter, second mode converter, third mode converter, fourth mode converter, etc.) can include an optical medium with at least one of etchings, gratings, fiber grating, chirped fiber gratings, refractive index variations, corrugations, thickness variations, or impedance variations. The optical medium can include a material through which electromagnetic waves propagate. The optical medium can include a form of transmission medium. The optical medium can include homogenous medium, heterogeneous medium, transparent medium, translucent medium, or opaque medium. The mode converter can convert the mode of an input wave from a first mode to a second mode different from the first mode.

FIG. 6B illustrates the device and an external tuning mechanism. The first mode converter 605 and the second mode converter 610 can be configured to generate a near-field with a first profile, responsive to the first mode converter 605 receiving a first input wave (e.g., input beam, input beam of coherent radiation, etc.). The first input wave can impinge on the first mode converter 605. The input beam can become a guided mode entering the arena on one side and interacting with the mode converter on the other side. This process can generate a counterpropagating mode with different spatial features. The cascaded interaction between the newly generated modes and the mode converters can repeat multiple times to create a sum of many guided waves. The superposition of these many waves can create the near-field landscape. The physical properties of the mode converters can determine the phase and amplitude of the guided modes in the arena and allow for the design of an arbitrary landscape. The first mode converter 605 and the second mode converter 610 can be configured to generate a near-field with a second profile, responsive to the first mode converter 605 receiving a second input wave. The first profile can be different from as the second profile. The first profile and the second profile can include, for example, an intensity profile, a frequency profile, or a polarization profile. The first input wave can be different from the second input wave. For example, the first input wave can include a first polarization and the second input wave can include a second polarization different from the first polarization. The first input wave can include a first frequency and the second input wave can include a second frequency different from the first frequency. The first input wave can include a first mode number and the second input wave can include a second mode number different from the first mode number. If the first input wave is the same as the second input wave, the first profile can be the same as the second profile. The first mode converter 605 and the second mode converter 610 can be configured to generate the near-field with a longitudinal near-field profile, responsive to the first mode converter 605 receiving the first input wave. The longitudinal near-field profile can include longitudinal wavevectors of the confined modes. The longitudinal near-field profile can include, for example, a longitudinal near-field intensity profile, a longitudinal near-field frequency profile, or a longitudinal near-field polarization profile. The first mode converter 605 and the second mode converter 610 can be configured to generate the near-field with a transverse near-field profile, responsive to the first mode converter 605 receiving the first input wave. The transverse near-field profile can include transverse wavevectors of the confined modes. The transverse near-field profile can include, for example, a transverse near-field intensity profile, a transverse near-field frequency profile, or a transverse near-field polarization profile.

FIG. 6C illustrates the device and an internal tuning mechanism. The first mode converter 605 can include a tunable mode converter. The second mode converter 610 can include a tunable mode converter. The tunable mode converter can include an acousto-optic modulator or an electro-optic modulator. The mode converters (e.g., first mode converter 605, second mode converter 610) can be tuned by electrical, mechanical, or optical signals. The near-field landscape can be reconfigured on demand by one or more tunable mode converters. The tunable mode converter can include a tuning mechanism. The tuning mechanism can include phase change materials, temperature tuning, micro-electromechanical systems (MEMS), or liquid crystals.

FIG. 6D illustrates the device and a coupling mechanism. The electromagnetic coupling between waveguides can be controlled. The device can include one or more waveguides 625 (e.g., first waveguide, second waveguide, third waveguide, fourth waveguide, etc.). The device can include a first waveguide. The first waveguide can include the first mode converter 605 and the second mode converter 610. The first waveguide can be configured to generate the near-field responsive to the first mode converter 605 receiving an input wave. The device can include a second waveguide. The second waveguide can be configured to generate an output wave (e.g., output beam) according to a coupling of the near-field between the first waveguide and the second waveguide. The second waveguide can include one or more mode converters.

FIG. 6E illustrates the device and particle sorting with optical tweezers. The device can include a waveguide. The waveguide can include the first mode converter 605 and the second mode converter 610. The waveguide can be configured to control a spatial position of a particle relative to the waveguide according to an input wave received by the waveguide. For example, the waveguide can position a particle at a first position responsive to receiving a first input wave. The waveguide can position a particle at a second position responsive to receiving a second input wave different from the first input wave. The near-field energy of the landscapes can be used to trap particles by optical tweezing. Particles can levitate above the surface of the waveguide. Particles may not necessarily be attracted to the surface. Particles can include, for example, subatomic particles (e.g., electrons), microscopic particles (e.g., atoms, molecules, etc.), or macroscopic particles (e.g., powders, granular materials, etc.). Particles can include, for example, biological matter (e.g., cells, DNA, etc.)

FIG. 6F illustrates the device and molecular sensing. The device can include a waveguide. The waveguide can include the first mode converter 605 and the second mode converter 610. The waveguide can be configured to sense a molecule proximate to the waveguide and output an indication of the sensing of the molecule. For example, the waveguide can output information responsive to a molecule present at a location proximate to the waveguide. The near-field landscape can interact with molecules lying on top of the arena by absorption. Spatial information about molecules distributions on top of the waveguide can be achieved by monitoring the output of the waveguide. This can be used for on-chip molecular sensing, for example, in the mid-infrared region of the electromagnetic spectrum where particles exhibit molecular fingerprints. Molecules can include, for example, biological macromolecules (e.g., carbohydrates, lipids, proteins, nucleic acids, etc.), homonuclear molecules (e.g., $O_2$, $H_2$, $N_2$, $O_3$, $As_4$, $P_4$, $S_2$, $S_3$, $S_6$, $S_5$, etc.), or heteronuclear molecules (e.g., $H_2O$, CO, NO, $NO_2$, MgO, HCl, KBr, HF, SiO, etc.).

FIG. 6G illustrates the device and optical routing of information. The optical routing of information can occur in a data center. The device can include one or more waveguides (e.g., first waveguide, second waveguide, third waveguide, fourth waveguide, fifth waveguide, etc.). Each waveguide of the one or more waveguides can include one or more mode converters. The device can include routing of signals between one or more waveguides. The device can include a first waveguide that includes the first mode converter 605 and the second mode converter 610. The first waveguide can be configured to generate a first near-field responsive to the first mode converter 605 receiving a first wave. The device can include a second waveguide that includes a third mode converter and a fourth mode converter. The second waveguide can be configured to generate a second wave according to a coupling of the first near-field between the first waveguide and the second waveguide. The second waveguide can be configured to generate a second near-field responsive to the third mode converter receiving the second wave. The device can include a third waveguide configured to generate a third wave according to a coupling of the second near-field between the second waveguide and the third waveguide. The third waveguide can includes a fifth mode converter and a sixth mode converter.

FIG. 6H illustrates an example nanofabrication process of the device. The process can include disposing (e.g., forming, fabricating, fusing, etc.) a photoresist layer (e.g., light-sensitive organic material) on a substrate. The photoresist layer and the substrate can form a sample. The process can include applying a patterned mask to the surface of the photoresist layer to block light. The process can include exposing the photoresist layer to light. A mask on the photoresist layer can allow a target pattern to form on the photoresist layer. The process can include developing the sample such that a portion of the photoresist layer is removed. The sample can include a substrate with a photoresist. The sample can be exposed on top of the landscape for lithography. After exposure and development of the resist, patterned samples with nanoscale features can be obtained.

FIG. 6I illustrates an embodiment of the device and mode conversion in optical fibers. The device can include a first mode converter 605 configured to receive an input wave of a first mode. The device can include a second mode converter 610 configured to generate an output wave of a second mode different from the first mode. The first mode converter 605 and the second mode converter 610 can define a region between the first mode converter 605 and the second mode converter 610. The region can be configured to contain a plurality of optical modes including at least three modes. The first mode converter 605 and the second mode converter 610 can be configured to generate a confined near-field via a conversion between the plurality of optical modes. For example, the first mode converter 605 and the second mode converter 610 can be used to engineer the field inside the optical fiber or waveguide. The confined near-field can include the near-field inside the optical fiber or inside the waveguide.

The device can include a waveguide. The waveguide can include an optical fiber 630. The waveguide can include the first mode converter 605 and the second mode converter 610. The first mode converter 605 and the second mode converter 610 can be configured to generate a superposition of modes in the region. The first mode converter 605 and the second mode converter 610 can be configured to generate a superposition of modes at the second mode converter 610 (e.g., behind the second mode converter 610). The superposition of modes can include modes which pass through each other without being disturbed. The superposition of modes can include a co-existence of modes.

The input wave can have a first polarization and the output wave can have a second polarization. The input wave can have a first frequency and the output wave can have a second frequency. The input wave can have a first wavelength and the output wave can have a second wavelength. The first mode converter 605 can include a tunable mode converter. The second mode converter 610 can include a tunable mode converter. The device can include an optical fiber 630 that includes the first mode converter 605 and the second mode converter 610. The first mode converter 605 and the second mode converter 610 can be configured to generate a near-field via a conversion between the plurality of optical modes.

FIG. 6J illustrates an embodiment of the device and fiber coupling mechanism. The device can include a first waveguide. The first waveguide can include a first optical fiber. The first waveguide can include the first mode converter 605 and the second mode converter 610. The first waveguide can be configured to generate the near-field responsive to the first mode converter 605 receiving an input wave. The device can include a second waveguide. The second waveguide can include a second optical fiber. The second waveguide can be configured to generate an output wave according to a coupling of the near-field between the first waveguide and the second waveguide. The second waveguide can include one or more mode converters. The device can include a silicon chip device. The device can include an on-chip evanescent fiber coupling mechanism. For example, the device can include one or more optical fibers 630 disposed on (e.g., formed/fabricated on, or formed fabricated using part of, fused on, and/or located on) a silicon chip. The device can include on-chip optical interconnects. The device can be part of a reconfigurable network. The network can determine whether there is a broken optical fiber 630. Rerouting of the network can occur on a millisecond timescale. The device can be used to delay an optical data pulse by an arbitrary length. Light can resonate inside the arena. The delay can be tuned by engineering the size of the arena and tuning the mode conversions.

There can be a subtlety related to the reflection coefficients $r_j$ appearing in Equations (1) and (2). These reflectance coefficients can be used to write down the near field at the interface of the waveguide. In that respect, they may not the same as the traditional reflection coefficients. Not only can they translate the conversion efficiency of one mode into the other, but they also can include the differences in the amplitude of each mode at the interface.

Figures 7A, 7B:
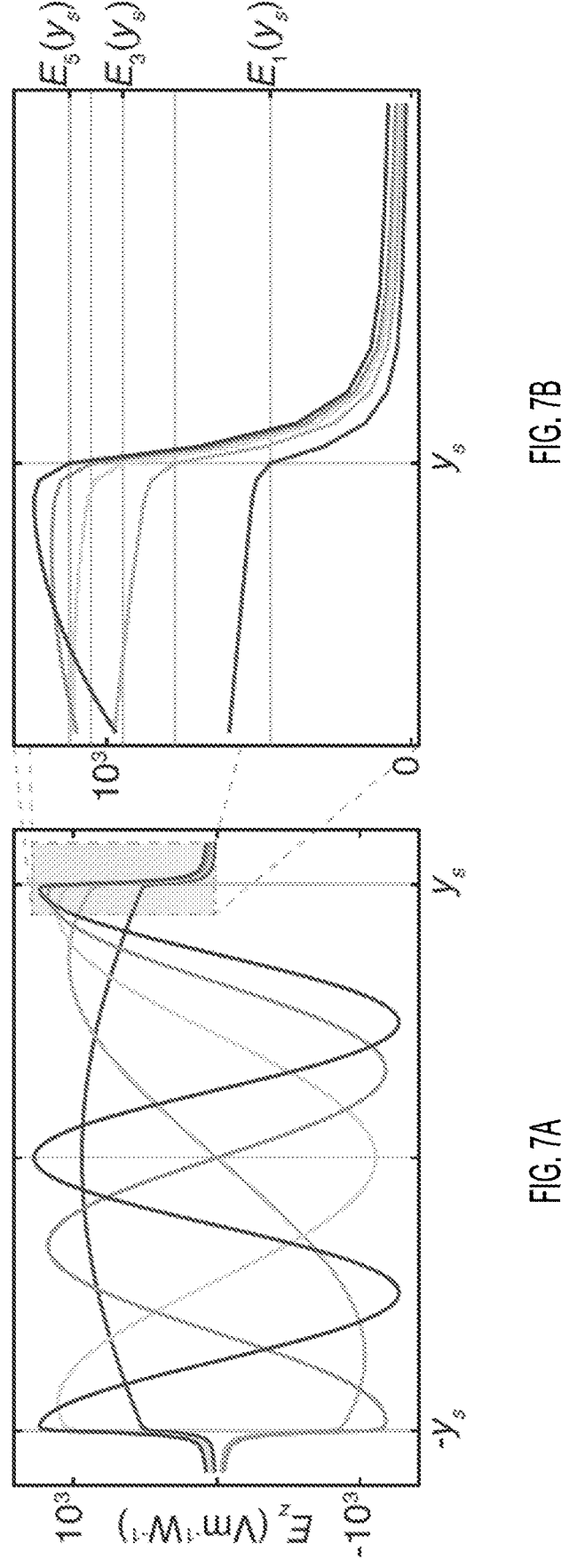
FIGS. 7A and 7B illustrate plots of the contribution of near-field amplitude differences to the reflection coefficients, according to an embodiment.

FIGS. 7A and 7B illustrate this discrepancy with the first five modes of the waveguide described above. Each mode is normalized to 1 watt input power. Higher order modes can have a larger amplitude at the interface than the fundamental mode. The difference between the amplitude of the lowest mode and the highest mode can be about a factor of 2. The reflection coefficients can be a little bit larger than 1.

Mathematically, the reflection coefficient from mode i to mode j can be written as $$r_{ij} = \frac{\int\int E_r(y, z)E_j^*(y, z)dydz}{\int\int E_i(y, z)E_i^*(y, z)dydz}, \tag{7}$$

where $E_r$, $E_i$, and $E_j$ are the amplitudes of the reflected field, the incident mode i and the target mode j, respectively. In order to find the near field reflection coefficient, the reflection coefficient in Eq. (7) can be multiplied with a second factor that compares the field strengths of the different modes at the interface ys $(E_j(y_s)/E_i(y_s))$. All modes can have a fixed polarization along the z-direction.

FIGS. 7A and 7B illustrate plots of the contribution of near-field amplitude differences to the reflection coefficients. FIG. 7A illustrates the mode profiles of the five modes of the waveguide used in the experimental setup. At the target frequency of 19 GHz, the effective indices of these five modes can equal $n_1=1.705$, $n_2=1.670$, $n_3=1.596$, $n_4=1.472$, $n_s$=1.282. FIG. 7B illustrates a zoomed-in perspective of the electric fields at the edge of the waveguide ($y_s$=13.5 mm). The electric field amplitude can vary significantly depending on the mode: $E_3(y_s)$=2.04$E_1(y_s)$, $E_5(y_s)$=2.42$E_1(y_s)$.

Various algorithms can be implemented to design the best fit of the target landscapes. Results can be obtained using an interior points method that finds the minimum of the cost function $g(r_i, \phi_i)$, defined as the normalized squared difference between the target function and the near-field intensity:

$$g(r_i, \phi_i) = \frac{\int_A (I_{target}(x) - I_{arena,AC}(x, r_i, \phi_i))^2 dx}{\int_A (I_{target}(x))^2 dx}, \qquad (8)$$

where both integrals can be evaluated on an interval $A$=[$x_{min}$, $x_{xmax}$], smaller than the theoretical near-field periodicity $L_p$=2$\pi$/gcd($K_i$). The initial values of the reflection amplitudes and phases can be set to 1 and 0, respectively. In the optimization, the reflection amplitudes can be constrained to remain smaller than 1.

$I_{arena,AC}(x, r_i, \phi_i)$ can be given by the second term of Eq. (2). The DC-term in Eq. (2) can add another spatially invariant shift to the intensity profile. The full intensity, the target and the fitted AC near field can be shown in FIGS. 8A-8C for several Gaussian target functions.

Figure 8B:
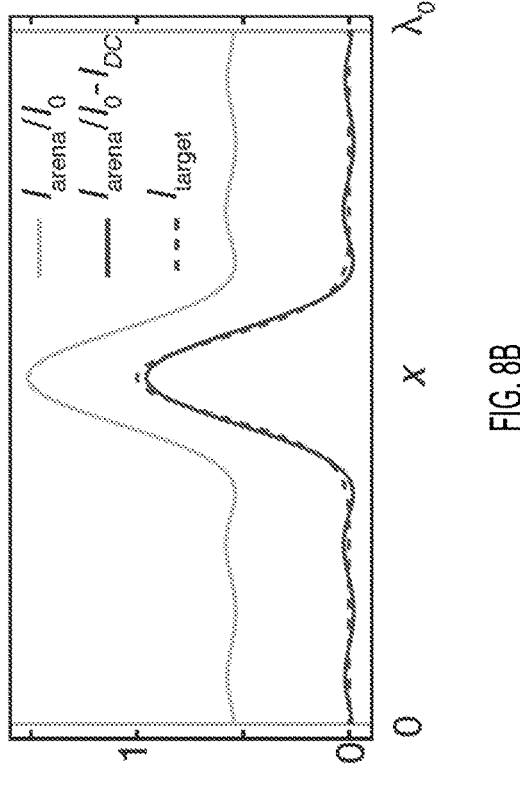
FIGS. 8A-8C illustrate plots of longitudinal near-field landscapes, according to an embodiment.
Figure 8C:
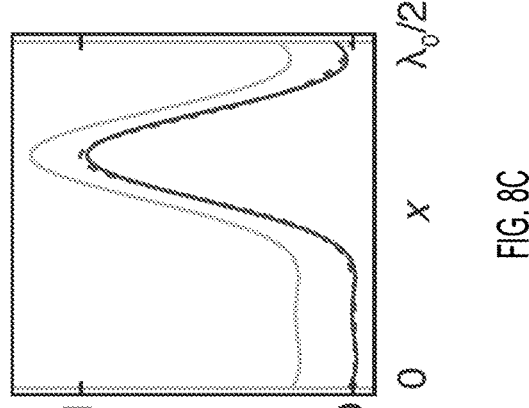
Figure 8A:
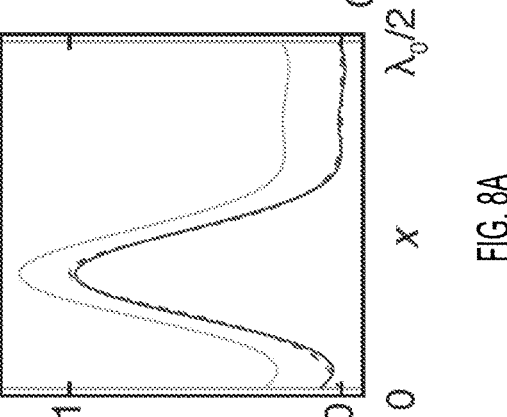

FIGS. 8A-8C illustrate plots of longitudinal near-field landscapes. The figures illustrate several examples of Gaussian target intensities that are fitted by a near-field intensity using four modes. The target intensities can be asymmetric with respect to the integration interval, as shown in FIGS. 8A and 8C. The near field in the arena can have a DC-contribution and an AC-contribution, corresponding to the first and the second term of Eq. (2). The algorithm can minimize the integrated squared difference between target function and the AC-term of the near field, as shown in Eq. (8). The effective indices of the modes can be $n_{eff,1}$=3.36, $n_{eff,2}$=2.6, $n_{eff,3}$=1.9, $n_{eff,4}$=1.1.

Figure 9B:
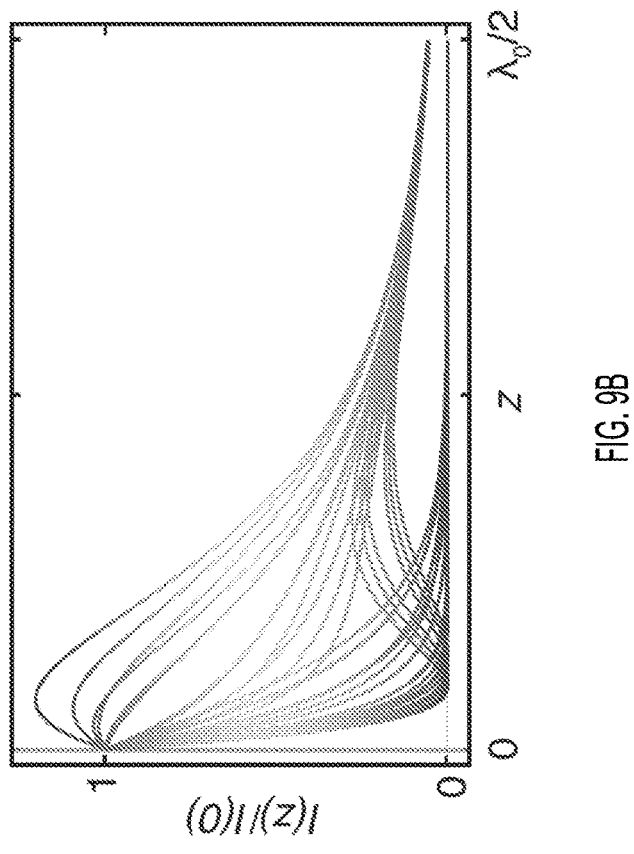
FIGS. 9A and 9B illustrate plots of lateral near-field landscapes, according to an embodiment.
Figure 9A:
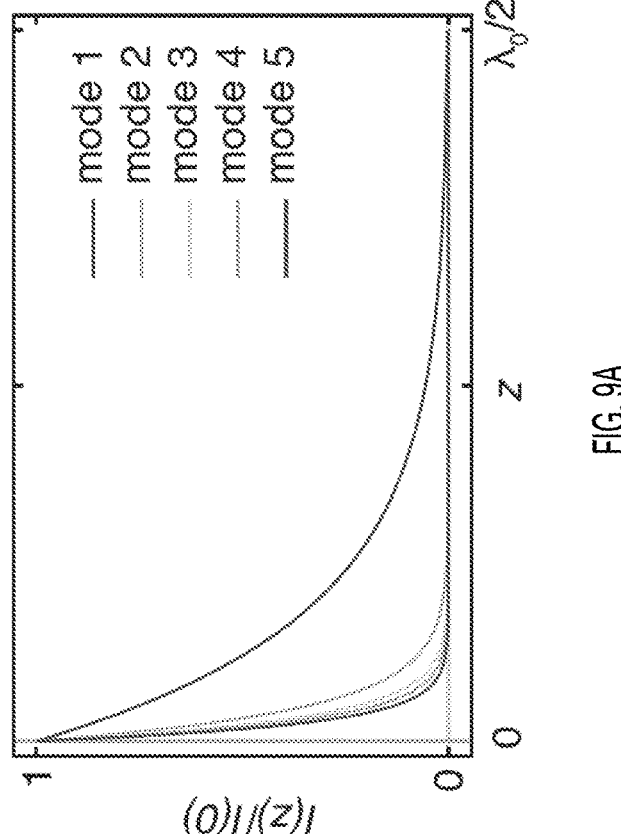

Since the evanescent field of each mode can characterized by a different decay constant, it is also possible to design the field in the lateral direction by superimposing different modes. The evanescent intensity decays of the first five modes of a typical waveguide are shown in FIG. 9A. The effective indices of the modes can be $n_{eff,1}$=3.37, $n_{eff,2}$=2.93, $n_{eff,3}$=2.59, $n_{eff,4}$=1.98, and $n_{eff,5}$=1.1. FIG. 9B illustrates the different decay profiles that are obtained by combining three modes of this waveguide with amplitudes equal to 1 or −1. FIG. 9B illustrates lateral near-field intensity variations that can be obtained using three modes of a five mode waveguide with amplitudes 1 or −1. In total sixty combinations can be possible, but some combinations result in the same intensity profile.

FIG. 9B demonstrates that non-monotonic behavior can be obtained using a superposition of modes with different decay constants. The transverse decay can be engineered generally. The design of intensity variations in the transverse direction can be conceptually different from the design in the longitudinal direction because the variation of the contributing modes in the transverse direction away from the interface is monotonously decreasing and the interface fixes the starting point of the transverse variation, by design. As a result, there may not be extra degree of freedom which allows for the extraction of a small variation from a longer signal (while this is the case in the longitudinal direction). Nevertheless, it is possible to design interesting near-field intensity variations by forcing the field to specific target values ($I^*(z_j)$) at various distances away from the surface in the transverse direction ($z_j$). This can be achieved by implementing the Levenberg-Marquardt method to find the minimum of a cost function $g(a_i)$, $$g(a_i) = \sum_j \left( \left| \sum_i a_i(E_i(z_j)) \right|^2 - I^*(z_j) \right)^2, \qquad (9)$$

where $a_i$ are the amplitudes of the different modes. This method can be more fragile than the design of the field in the longitudinal direction. For instance, if too many points ($z_i$, $I^*(z_i)$) are fixed in the lateral direction, it is possible that no solution will be found. In addition, for variations that are extremely different from the traditional monotonous behavior, solutions can be found with very large coefficients. Physically, this can mean that a lot of energy is deposited in the system outside the region where the specific variation occurs.

Isolated intensity nodes can be designed. A node can be created at the interface whenever the sum of all mode amplitudes equals 0: $\Sigma a_i$=0. In that case, not just one node, but an array of nodes can be created along the surface, with a periodicity that can be determined by the longitudinal k-components of the modes involved. FIG. 10A illustrates a plot the near-field intensity in the (x, z)-plane with $a_1$=1 and $a_2$=1. For different combinations of the amplitude, the node can be shifted away from the interface. FIGS. 10B-10D illustrate plots of more nodes added to the system. FIGS. 10B and 10C illustrate that a superposition of three and four modes, respectively, widens the region with low intensity ($a_1$=1, $a_2$=−1, $a_3$=1) in (FIG. 10B) and ($a_1$=1, $a_2$=−1, $a_3$=1, $a_4$=0.5) in (FIG. 10C). FIG. 10D illustrates that an isolated intensity minimum appears in the superposition of five modes ($a_1$=1, $a_2$=−1, $a_3$=1, $a_4$=1, $a_5$=−1). By combining several modes, the spatial width of the nodes can be increased. In this way, an isolated intensity minimum can be created, at a finite distance away from the interface.

It can be possible to excite in the arena all the supported modes of the waveguide by a configuration where, in addition to the $\beta$-conversions, one traditional reflection is added. This way, all modes can be excited in both propagation directions. To avoid modes being scattered to the continuum, it can be opportune to sequentially arrange the $\beta$-conversions in order of increasing magnitude. As an example, FIGS. 11A-11C illustrate that all the modes of a three-mode waveguide can be excited, through an adequate structure.

FIGS. 11A-11C illustrate schematics of a step-by-step roundtrip excitation of modes (e.g., all modes) of a three-mode waveguide, propagating in both directions, using a single incident mode and three mode converters. FIG. 11A illustrates the interaction of the field with the different mode converters, highlighting the field in the arena at the different steps. FIGS. 11B and 11C illustrate the different steps shown in FIG. 11A visualized in reciprocal space (FIG. 11B) and in compact polygon notation (FIG. 11C). In each step, the arrows represent the mode conversion highlighted in FIG. 11A. The not-connecting arrows in FIG. 11C in steps 2, 4, 8, 10 and 11 can show that no mode-conversion can take place because of the mismatch between the impedance variation and the incident mode. Different $\beta$-converters can be materialized in the same physical component. The resulting impedance variation per component can be a sum of functions with different periodicities.

FIGS. 12A-12D give an overview of four different configurations that can be possible in an n-mode system, depending on the parity of the number of modes and whether all modes are excited in both directions or in one propagation direction. The parity of the number of modes can determine whether the converter β11 needs to be added to the left (even) or to the right (odd) of the arena. This converter can enable the full roundtrip covering all modes in both propagation directions, only added in configuration FIGS. 12B and 12D.

FIGS. 12A-12D illustrate different configurations of the β-converters that excite modes (e.g., all modes) in the arena. The formula on top of the β-converters can show the spectral components of the impedance variation of the converter. The formulas in the arena summarize which modes can be excited in the arena and whether or not the mode reflects on or transmits through the entire device. The polygon on the right of the waveguide can visualize how the incident mode $\beta_n$ is converted into the sum of all available modes. FIG. 12A illustrates a waveguide with an even number of modes, and each mode is excited just once. FIG. 12B illustrates a waveguide with an even number of modes, each mode is excited twice, once in each propagation direction. FIG. 12C illustrates a waveguide with an odd number of modes, and each mode is excited just once. FIG. 12D illustrates a waveguide with an odd number of modes, each mode is excited twice, once in each propagation direction.

The impedance variation can implement the selective β-conversion. In reciprocal space, the ideal reflection-profile r(x) along the reflector can correspond to a Dirac delta function at $\Delta\beta_{ij}$. In reality, however, an infinitely sharp delta function can be unattainable. A sinc-function can be obtained, the width of which is inversely proportional to the effective length of the reflector. The effective length can correspond to the distance that a wave travels through the reflector before it is attenuated too strongly. In case an incident mode is strongly reflected by impedance variations, the wave may not reach the end of the reflector and the effective length may be much shorter than the physical length. The length of the reflector can be related to the effective scattering strength.

To avoid a DC-component in the spatial frequency representation of the reflection, it can be convenient to implement a pure sinusoidal variation rather than a rectangular one. For a guided wave grating, an impedance variation and the reflection variation may not the same. Assuming the reflection was implemented using a variation of the refractive index n(x), in first order, the reflection r(x) can be approximated by the Fresnel reflection coefficient for a perpendicular incident wave. For a small change of the variable x, $$r(x) \approx \frac{1}{\Delta x} \frac{n(x + \Delta x) - n(x)}{n(x + \Delta x) + n(x)} \tag{10}$$

$$r(x) \approx \frac{n'(x)}{2n(x)} \tag{11}$$

This equation can be rewritten by expressing n(x) as a function of r(x):

$$n(x) = \exp\left[2 \int_0^x r(s)ds\right]. \tag{12}$$

This equation can allow for the approximate calculation of a refractive index variation that implements a certain reflection variation. A sinusoidal reflection amplitude r(x) can be implemented using the following index variation:

$$n(x) = \exp[-2\cos(x)]. \tag{13}$$

The devices can be fabricated on a Rogers RT/duroid 6002 PCB substrate (thickness 127 μm, relative permittivity 2.94). The design frequency can be chosen as 19 GHz as a trade-off to avoid excessive size for lower frequencies and excessive losses for higher frequencies. The thickness of the PCB can be chosen also as a trade-off to avoid excessive radiation losses that would occur with a thicker dielectric spacer and avoid excessively low mode impedance and mechanical instability which occur for thinner ones.

The central part of the device (reflectors and arena) can be based on a multimode microstrip line. Common microstrip lines can be narrow enough to allow the propagation of a single mode, but increasing the width it can be possible to allow the propagation of multiple modes. The width can be selected to allow the propagation of 5 modes.

Figure 13B:
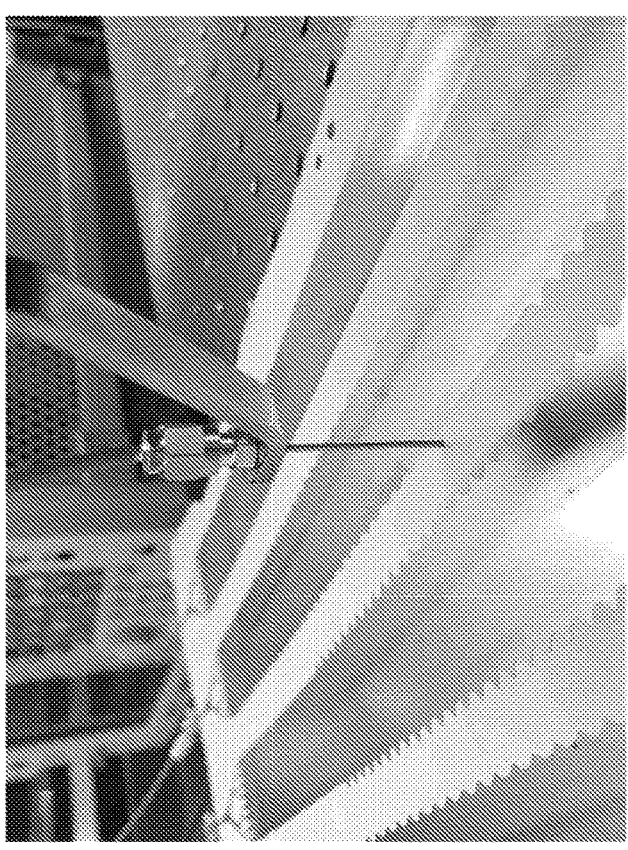
FIGS. 13A-13C illustrate a set-up for the near-field scanning microwave microscopy, according to an embodiment.
Figure 13A:
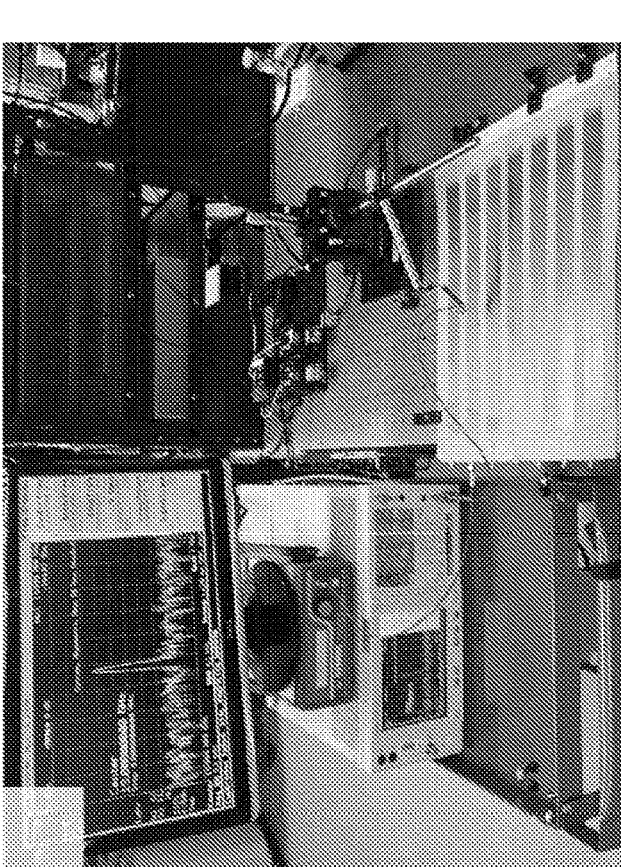
Figure 13C:
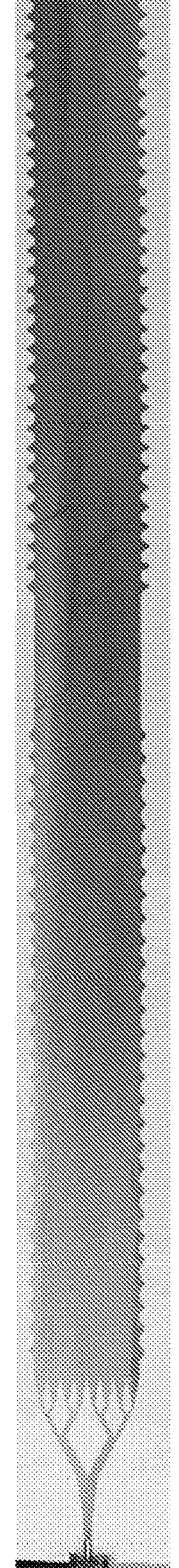

FIGS. 13A-13C illustrate an embodiment of a set-up for the near-field scanning microwave microscopy. FIG. 13A illustrates a microwave probe which is mounted on a motorized xyz stage and which scans the near-field signal in proximity of the arena of a landscape device (FIG. 13B), which is fed by a frequency synthesizer. The signal can be recorded using a spectrum analyzer. FIG. 13C illustrates a landscape device with input and output tapers, two β-converters and the arena at the center. The near-field set-up can include a frequency synthesizer, a near-field probe mounted on a motorized stage and a spectrum analyzer. The device can be connected to the synthesizer (Hittite HMC T2100B) via an SMA connector and a high-frequency cable. The synthesizer can be tunable in power and frequency: the power can be set to −5 dBm for all experiments, while the frequency can be scanned in steps of 40 MHz. The probe (Taoglas CAB058) can have an inner conductor diameter of 300 μm, much smaller than the shortest wavelength used in these studies (15 mm at 20 GHz). The protruding central conductor of the probe can be cut to achieve the best imaging resolution. The probe can be mounted on a xyz motorized stage. Rotation stages can be used to align the probe along the z-direction, perpendicular to the microstrip plan, in order to measure the $E_z$ component of the field. The spatial step size in the scans can be approximately 250 μm. In scans where the height of the probe is fixed, the tip can first be brought in contact with the top copper layer of the microstrip, then retracted by 200 μm. The probe signal can be directly recorded by the spectrum analyzer (Agilent E4448A) without any amplification. The scans and acquisitions can be automated. Types of scans can include (x, y) scan at fixed frequency (f=19 GHz, being the design frequency of the devices) and (x, f) scans at fixed elevation (z=200 μm). In both cases, the scans can be done on top of the dielectric next to the arena, at a distance of y=1.3 mm from the edge of the top copper layer.

Figure 14:
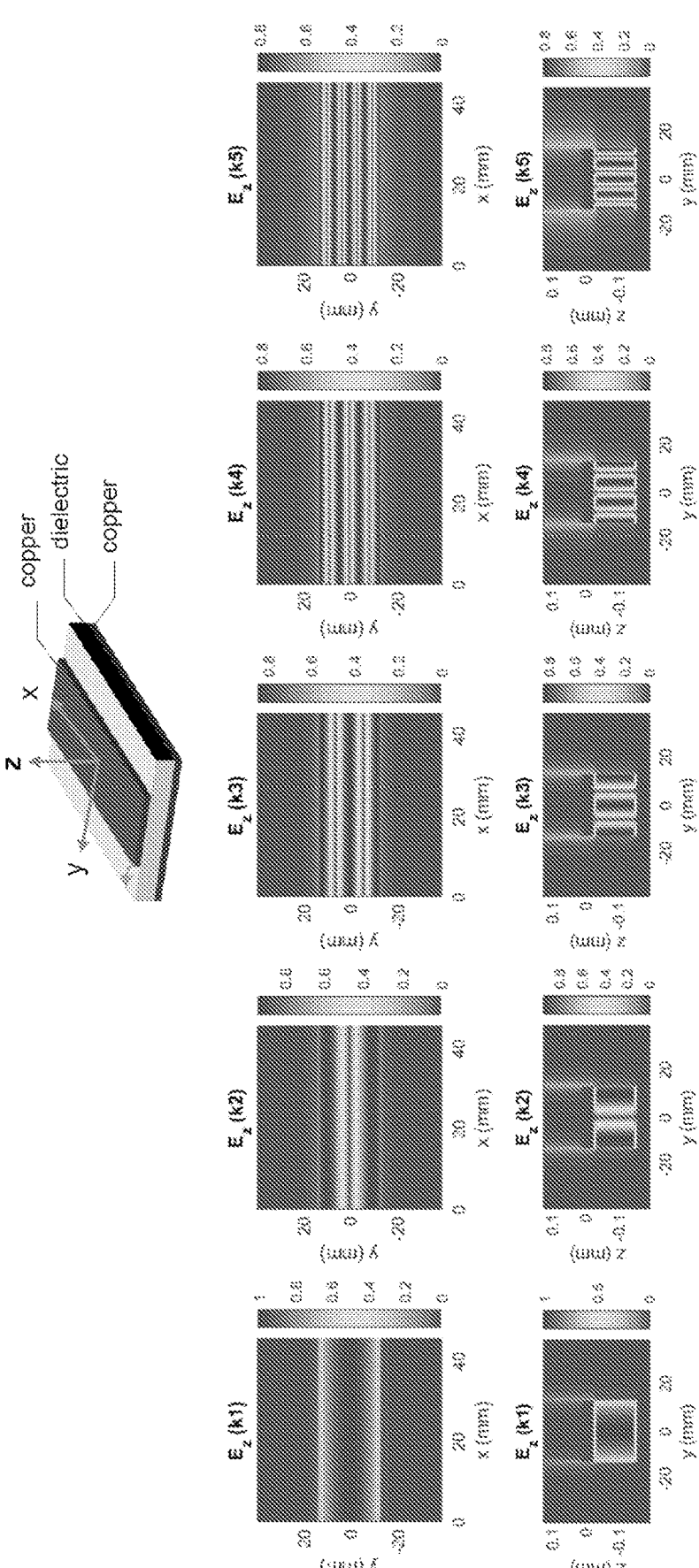
FIG. 14 illustrates a 3D simulation of the electromagnetic field distribution of the first five modes in the microwave strip, according to an embodiment.

The numerical simulations can be performed using the Lumerical's Multiphysics Simulation Suite. In a first step, the electromagnetic modes of the waveguide can be characterized using the MODE simulator. The retrieved mode profiles are shown in FIG. 14. In a second step the reflection coefficients of the mode convertors can be calculated using the finite difference time domain (FDTD) numerical solver.

These coefficients can be retrieved by sampling the reflected field at a probe surface away from the reflector and calculating the overlap integral with the target mode.

The exact geometry of the fabricated device can be imported in Lumerical using a Matlab script. The simulation domain can be finely meshed with largest mesh sizes corresponding to $\Delta x = 350$ μm, $\Delta y = 200$ μm, $\Delta z = 20$ μm.

FIG. 14 illustrates a 3D simulation of the electromagnetic field distribution of the first five modes in the microwave strip. Simulation structures can include copper with a thickness of 35.6 μm and a width of 26 mm (five modes can be supported with this width), 127 μm dielectric layer with relative dielectric constant 2.94, thick copper. The simulation frequency/wavelength is 19 GHz/15778.6 μm. The effective index of these five modes are $n_1 = 1.705$, $n_2 = 1.670$, $n_3 = 1.596$, $n_4 = 1.472$, $n_5 = 1.282$.

One purpose of the feeding network can be to expand the signal coming from the microwave source into the desired initial mode. This can be done efficiently and with high modal purity. For example, the network can excite only the target mode and minimize the power of the other modes. The target mode can be the fundamental mode of the microstrip line, which can make the design of the feeding network simpler. One choice for the feeding network can be a long taper from a narrow single mode microstrip line. However this solution may not be compact and may need an excessive amount of space on the board to achieve the required mode purity. A compact feeding network which can provide the required performance can be achieved using a sequence of power dividers to synthesize the field distribution matching the desired mode. Each power divider can split an input microstrip into two output microstrips.

For a microstrip the mode admittance can be defined as the reciprocal of the mode impedance. With a good approximation the mode admittance can be proportional to the width of the waveguide. This can imply that the sum of the width of the two output strips is equal to the width of the input strip. Impedance matching can be possible if the input and output admittances are the same, and the total output admittance can be the sum of the admittances of the two output lines. The ratio of the width of the two output lines can be selected considering that the amount of power that goes to each of the branches is proportional to its admittance, and hence it is approximately proportional to the width. Smaller tapers can be used in the structure to increase the width of the strip at the input port and at the very end of the feeding network, to seamlessly connect to the multimode strip. The correct operation of the feeding network can be validated with full wave simulations. The coupling efficiency with the first mode is 95%, with the third mode is 2.1%, and with the fifth mode is 0.6%. The coupling efficiency with the second and fourth mode can be 0 by symmetry since these are odd modes and the feeding network is symmetrical.

Figure 15A:
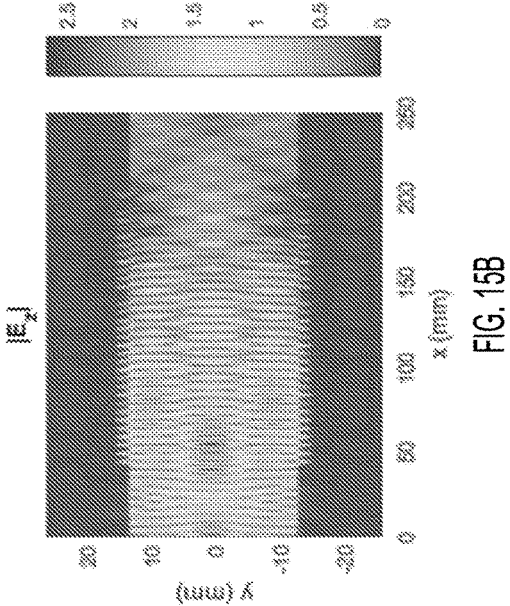
FIGS. 15A-15D illustrate full wave simulation of the $\beta$-converters, according to an embodiment.
Figure 15B:
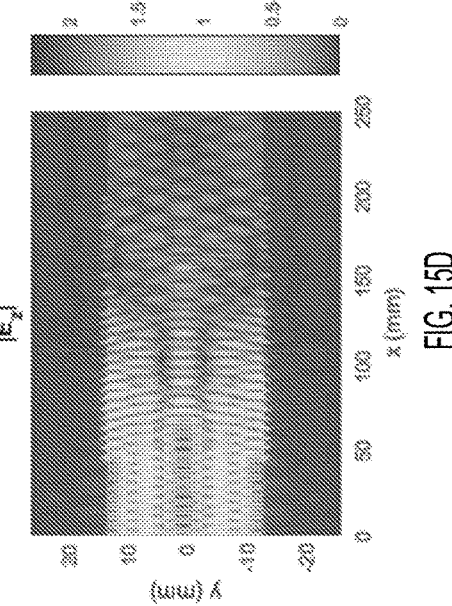
Figure 15C:
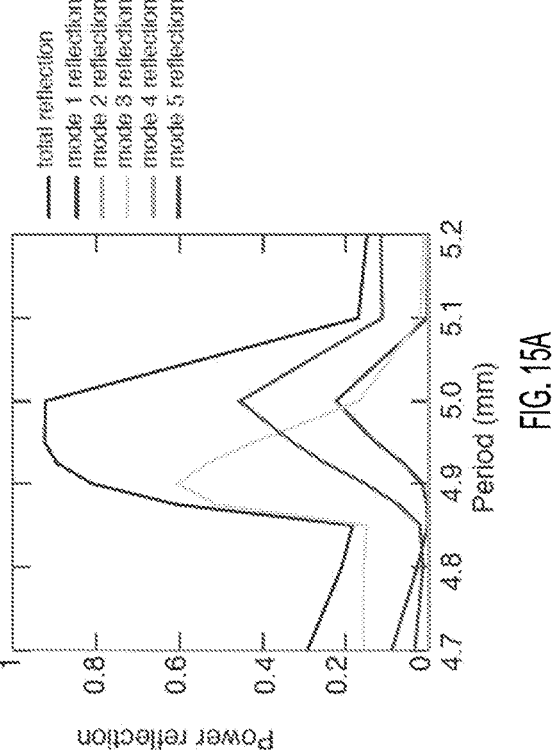

FIGS. 15A-15D illustrate full wave simulation of the β-converters. FIG. 15A illustrates that the grating height is 2.08 mm and the input mode is β1. The period can be swept and the reflected modes from the β1 to β3 gratings can be monitored. The optimized period can be 4900 μm. The total reflected power can be 81.0% of the incident power and that of β3 can be 74.7% (=60.5%/81%). FIG. 15B illustrates the electric field distribution. The grating height can be 2.08 mm and the grating period can be 4900 μm. FIG. 15C illustrates that the grating height can be 1.3 mm and the input mode can be $\beta_3$. The period can be swept and the reflected modes from the β3 to β5 gratings can be monitored. The optimized period can be 5659 μm. The total reflected power can be 97.0% of the incident power and that of $\beta_5$ can be 94%

Figure 15D:
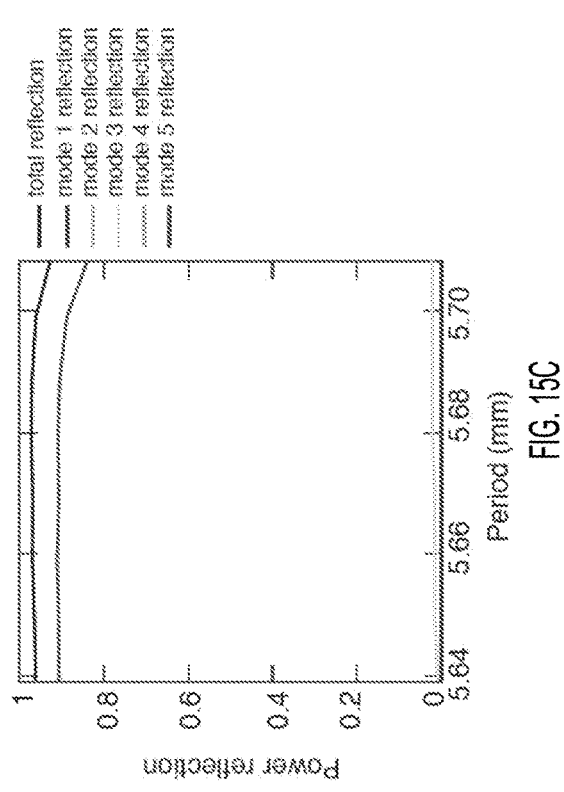

(=91.1%/97%). FIG. 15D illustrates the electric field distribution. The grating height can be 1.3 mm and the grating period can be 5659 μm.

Figure 16A:
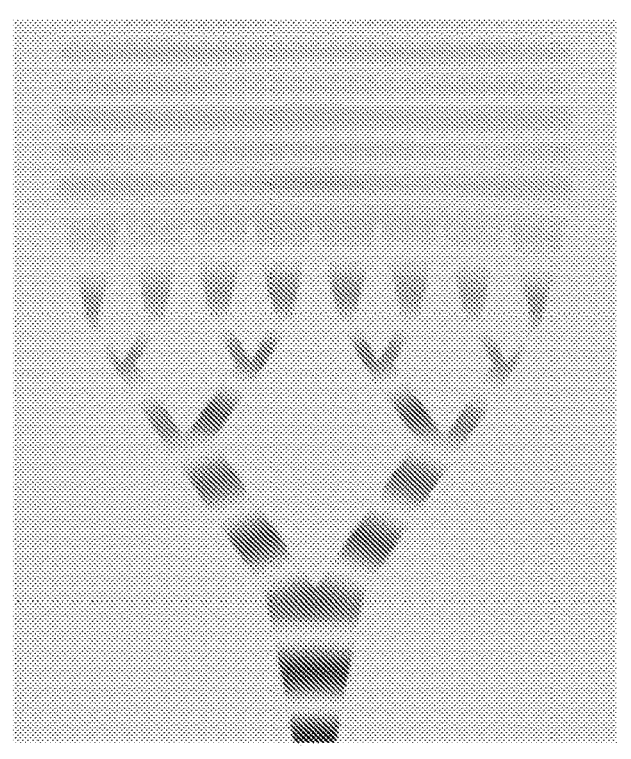
FIGS. 16A and 16B illustrate the design and full wave simulation of input feeding network, according to an embodiment.
Figure 16B:
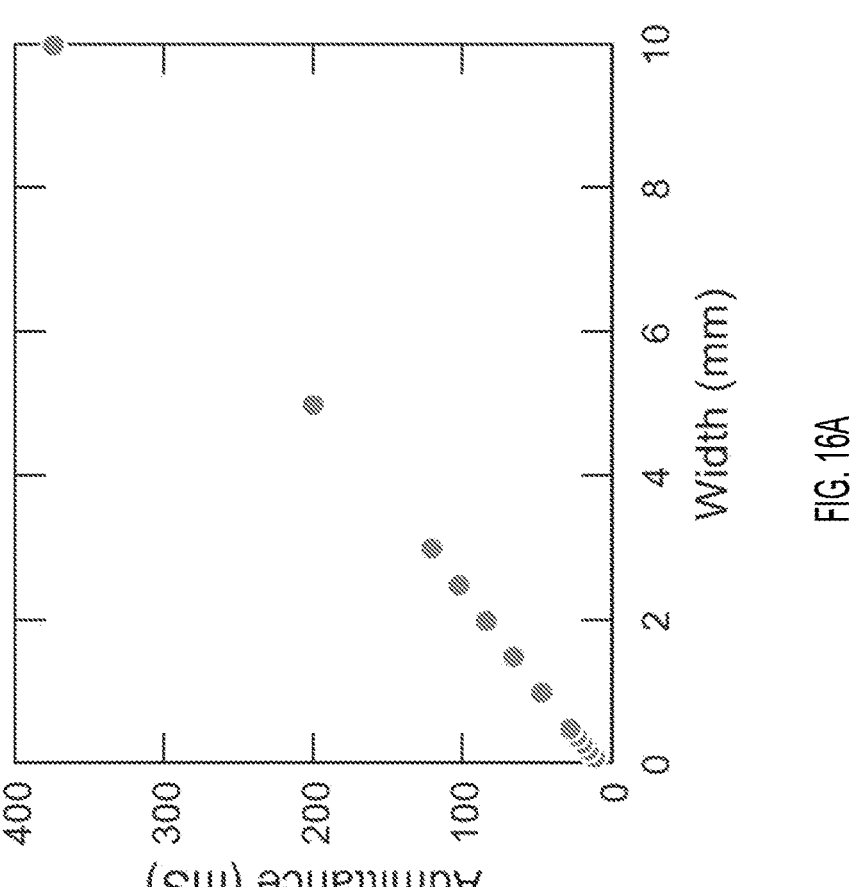

FIGS. 16A and 16B illustrate the design and full wave simulation of input feeding network. FIG. 16A illustrates modal admittance as a function of the width of the microstrip. FIG. 16B illustrates a full wave simulation of the electric field in the feeding network. The real part of the normal field is displayed.

An absorber can be located at the end of each device to ensure that no mode is reflected back. For a single mode microstrip, this can be achieved with a single resistor with a value identical or sufficiently close to the impedance of the strip (e.g., a matched load). An array of 10 resistors can be used to emulate a perfectly matched layer (PML) for all modes in the waveguide. The width of the multimodal line can be 26 mm, therefore each section of the array can be 2.6 mm wide. A 10 mm long taper can be used to decrease the width of each section to 0.9 mm, so that the impedance of the line is increased to a value of 23.77Ω. An RF resistor (25Ω) can be soldered across this line and via hole connected to the ground plane so that the resistor acts as a matched load.

Figure 17C:
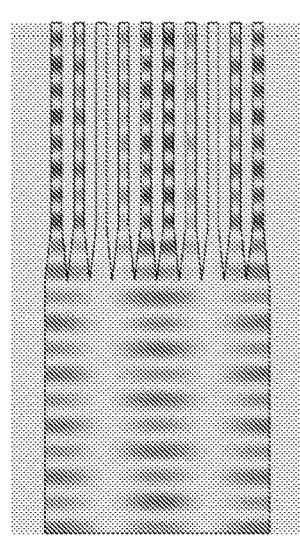
FIGS. 17A-17E illustrate a full wave simulation of the absorbing termination, according to an embodiment.
Figure 17E:
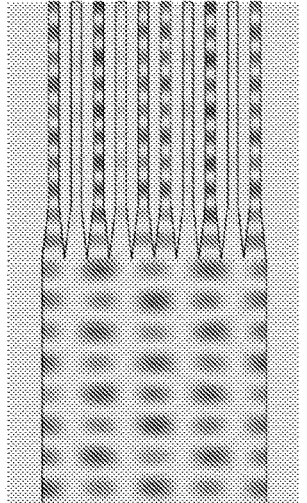
Figure 17B:
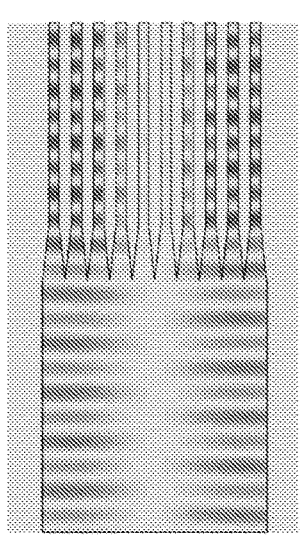
Figure 17D:
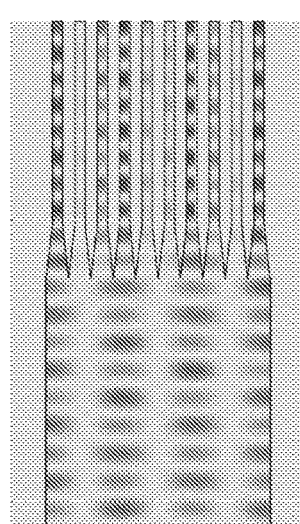
Figure 17A:
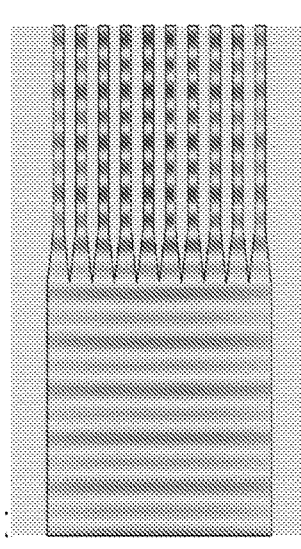

FIGS. 17A-17E illustrate a full wave simulation of the absorbing termination. FIGS. 17A-17 illustrate the real part of the normal electric field for modes 1 to 5 respectively. The operation of the absorbing termination can be verified with full wave simulations and experimentally with measurements on the control device. The simulations can predict reflectivity of just 10% for the fundamental mode, 2% for the third mode and 4% for the fifth mode.

Acquiring accurate near-field microwave images can rely on a careful choice of the geometry of the near-field probe. FIGS. 18A-18H illustrate a comparison between measurements of the control device (multimode microstrip without reflectors) obtained with the commercial probe, which has a 6 mm long protruding conductor, and measurements after cutting its inner conductor. The frequency synthesizer power can be set to −30 dBm in the first case, and to −5 dBm in the second case, because in the absence of a protruding conductor the signal can be much weaker. As it can be observed from the frequency scans (FIGS. 18A and 18E), measurements using the probe without protruding conductor can exhibit a better signal to noise ratio, in particular the node lines are continuous. The average power can decay as a function of frequency in both cases (FIGS. 18B and 18F) due to high frequency losses of the various electronic components (e.g., cable, probe, etc.). The oscillations in these curves can be attributed to two effects: 1) probe resonances and 2) stronger evanescent tail of residual higher order modes close to cut-off. The amplitude of these oscillations can be smaller in the case of a probe without protruding conductor. The geometry of the probe and the scan distance from the sample surface can be important. The elevation maps measured at 19 GHz can highlight this effect (FIGS. 18C and 18G) and can show in particular that in the case of a probe with a protruding conductor spurious effects can occur at large (≈λ) distances from the surface (comparing the cuts in FIGS. 18D and 18H). These studies can confirm that using a probe without protruding conductor scanned close to the sample surface (in our case 200 μm) is a good measurement condition for the investigations.

FIGS. 18A-18H illustrate the characterization of the effect of a protruding conductor in a near-field scanning microwave probe. Measurements of the control device using a commercial probe with a 6 mm long protruding conductor are shown in FIGS. 18A-18D. Measurements of the control device using a probe without a protruding conductor are shown in FIGS. 18E-18H. FIGS. 18A-18E show frequency scans together with their average power vs. frequency (FIGS. 18B and 18F). FIGS. 18C and 18G show elevation scans at 19 GHz together with line cuts (FIGS. 18D and 18H) along the directions indicated by dashed lines in FIGS. 18C and 18G. In all maps, the x-axis corresponds to a line scan of length 24.5 mm parallel to the direction of the microstrip and on top of the dielectric.

Figure 19A:
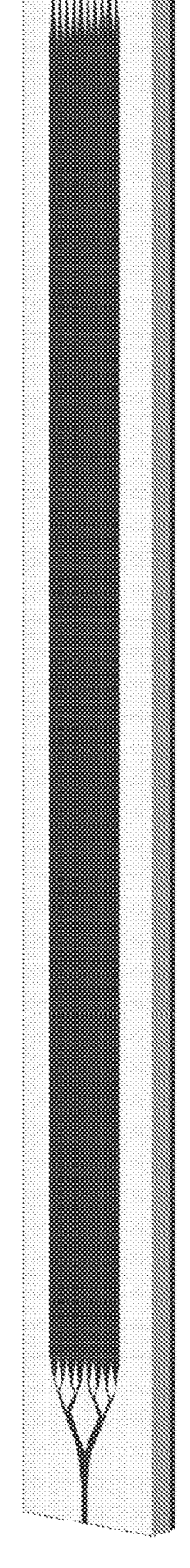
FIGS. 19A-19D illustrate a characterization of the input and output tapers by studying the control device, according to an embodiment.

Before characterizing the landscape device, the input and output tapers can be verified to work. A control device can be fabricated with the same structure of the landscape device except for the reflectors, which are not included (FIG. 19A). The frequency scan of the control device can reveal standing waves that provide several pieces of information. From their periodicity the effective index of the dominating mode that propagates in the waveguide can be deduced (FIG. 19B). Its mean value can be 1.706±0.036 which can be in agreement with the theoretical value of the fundamental mode $n_{eff,1}$=1.705 (FIG. 19C). The input tapers can inject the fundamental mode in the waveguide with high purity. From the nodes and antinodes of the standing waves, the voltage standing wave ratio can be extracted and the power reflection coefficient of the dominant mode propagating in the structure can be obtained. The power reflection coefficient can be fairly constant across the 18-20 GHz range and can show values around 1% (FIG. 19D), which can be in agreement with our simulations of the output tapers.

Figure 19D:
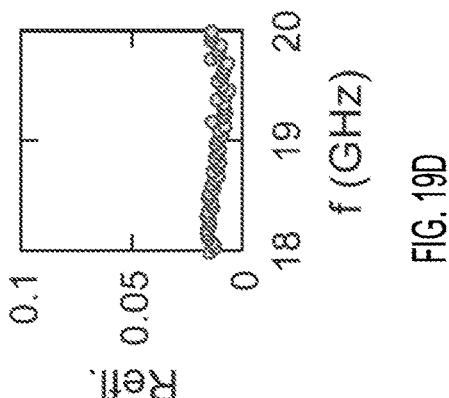
Figure 19C:
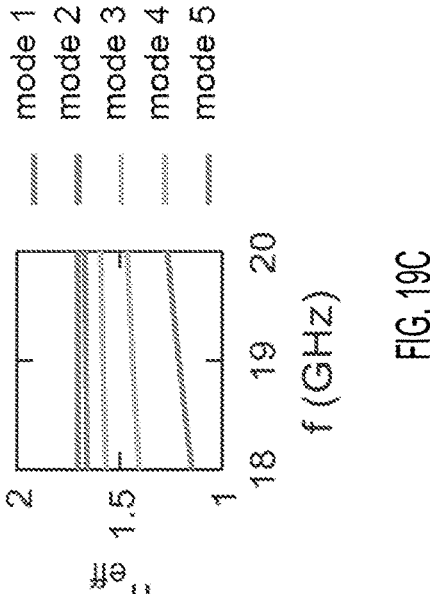
Figure 19B:
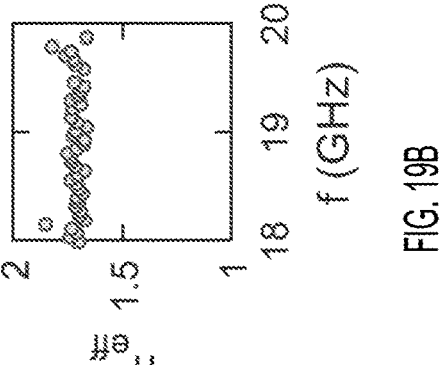

FIGS. 19A-19D illustrate a characterization of the input and output tapers by studying the control device. FIG. 19A illustrates a schematic of the control device. This multimode microstrip does not include any reflector which can be different form the landscape device. FIG. 19B illustrates the effective index of the dominating mode propagating in the waveguide, which can be in agreement with the fundamental mode index-frequency curve obtained from simulations in FIG. 19C. FIG. 19D illustrates the power reflection coefficient of the output tapers.

Figures 20A, 20B, 20C:
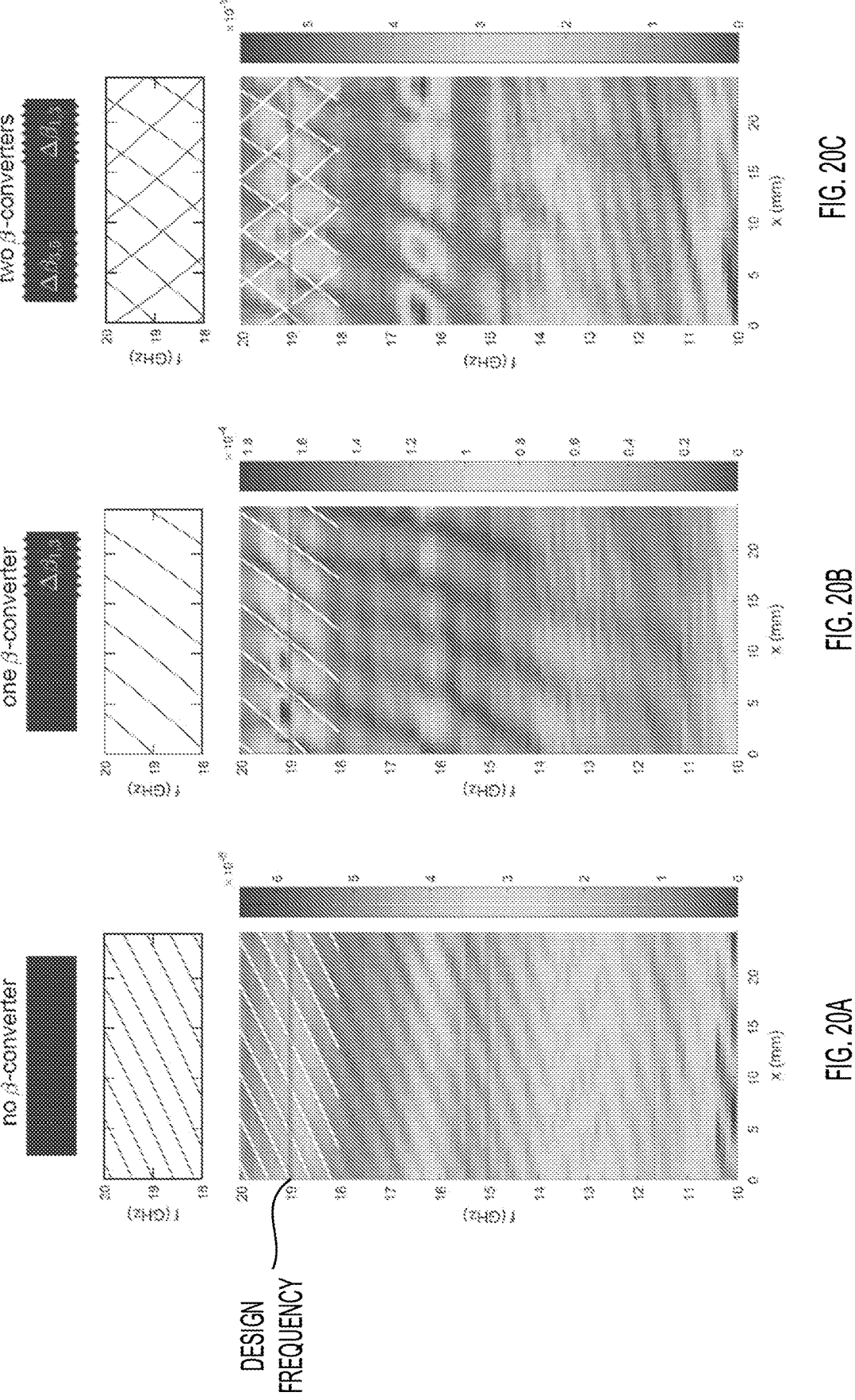
FIGS. 20A-20C illustrate the frequency response of three microstrip devices characterized in the near field, according to an embodiment.

The characterization of three different microstrip devices over a relatively small interval (2 GHz) around the design frequency ($f_0$=19 GHz) were presented. The frequency response of these devices over a broader range can be studied. FIGS. 20A-20C show characterizations between 10 and 20 GHz. The effect of the mode conversion mechanism on these maps can be striking. At low frequencies the three devices can show similar features—primarily standing waves induced by the small reflection of the fundamental mode at the end tapers. These can define hyperbolae in the frequency plots. The β-converters can be essentially invisible at such low frequencies as they may not couple modes because the modes indices are different from the ones used in the design at $f_0$, due to dispersion. On the other hand, at high frequencies the devices incorporating the β-converters (FIGS. 20B and 20C) appear very different from the bare multimode microstrip (FIG. 20A). The device with the single $\Delta\beta_{13}$ converter shows hyperbolae with a different tilt. The change in the spacing between the nodes can be due to the fact that the first and third mode have different refractive indices, as opposed to the case of the bare microstrip where the standing waves are created by the interference of counter-propagating waves at the fundamental mode. The landscape device can show a peculiar checker pattern around $f_0$, which can show a roundtrip in the arena with mode conversion. This pattern can be due to the crossing of two families of hyperbolae created by the reflections at the two β-converters.

FIGS. 20A-20C illustrate the frequency response of three microstrip devices characterized in the near field. The frequency characterization can be carried out over a large range, between 10 and 20 GHz. FIG. 20A illustrates a simple multimode microstrip used as a control device. FIG. 20B illustrates a microstrip including one β-converter. FIG. 20C illustrates a landscape device with two β-converters. All devices can include input and output tapers (not shown). The horizontal line indicates the design frequency. The dashed lines are a guide for different features discussed.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A device, comprising:
a first mode converter and a second mode converter that define a region between the first mode converter and the second mode converter, the region configured to contain a plurality of optical modes comprising at least three modes,
wherein the first mode converter and the second mode converter are configured to generate a near-field via a conversion between the plurality of optical modes, and
wherein:
the first mode converter and the second mode converter are configured to generate a near-field with a first profile, responsive to the first mode converter receiving a first input wave; and
the first mode converter and the second mode converter are configured to generate a near-field with a second profile, responsive to the first mode converter receiving a second input wave; and
the first mode converter or the second mode converter comprises a tunable mode converter.

2. The device of claim 1, wherein the tunable mode converter comprises an acousto-optic modulator or an electro-optic modulator.

3. A device, comprising:
a first mode converter and a second mode converter that define a region between the first mode converter and the second mode converter, the region configured to contain a plurality of optical modes comprising at least three modes, wherein the first mode converter and the second mode converter are configured to generate a near-field via a conversion between the plurality of optical modes;
a first waveguide that includes the first mode converter and the second mode converter, the first waveguide configured to generate the near-field responsive to the first mode converter receiving an input wave; and
a second waveguide configured to generate an output wave according to a coupling of the near-field between the first waveguide and the second waveguide.

4. The device of claim 3, wherein:
the first waveguide comprises a first optical fiber and the second waveguide comprises a second optical fiber; or
the device is a silicon chip device.

5. A device, comprising:
a first mode converter and a second mode converter that define a region between the first mode converter and the second mode converter, the region configured to contain a plurality of optical modes comprising at least three modes, wherein the first mode converter and the second mode converter are configured to generate a near-field via a conversion between the plurality of optical modes; and
a waveguide that includes the first mode converter and the second mode converter, the waveguide configured to control a spatial position of a particle relative to the waveguide according to an input wave received by the waveguide, or sense a molecule proximate to the waveguide and output an indication of the sensing of the molecule.

6. The device of claim 1, further comprising:
a first waveguide that includes the first mode converter and the second mode converter, the first waveguide configured to generate a first near-field responsive to the first mode converter receiving a first wave;

a second waveguide that includes a third mode converter and a fourth mode converter, the second waveguide configured to:

generate a second wave according to a coupling of the first near-field between the first waveguide and the second waveguide; and generate a second near-field responsive to the third mode converter receiving the second wave; and a third waveguide configured to generate a third wave according to a coupling of the second near-field between the second waveguide and the third waveguide.

7. The device of claim 1, wherein:

the first mode converter and the second mode converter comprise an optical medium with at least one of etchings, gratings, refractive index variations, corrugations, thickness variations, or impedance variations; or the first mode converter and the second mode converter are configured to generate the near-field with a longitudinal near-field profile, responsive to the first mode converter receiving a first input wave; or the first mode converter and the second mode converter are configured to generate the near-field with a transverse near-field profile, responsive to the first mode converter receiving a first input wave.

8. The device of claim 1, wherein:

the first mode converter and the second mode converter are configured to generate a near-field with a first profile, responsive to the first mode converter receiving a first input wave with a first polarization; and the first mode converter and the second mode converter are configured to generate a near-field with a second profile, responsive to the first mode converter receiving a second input wave with a second polarization.

9. The device of claim 1, wherein:

the first mode converter and the second mode converter are configured to generate a near-field with a first profile, responsive to the first mode converter receiving a first input wave with a first frequency; and the first mode converter and the second mode converter are configured to generate a near-field with a second profile, responsive to the first mode converter receiving a second input wave with a second frequency.

10. The device of claim 1, wherein:

the first mode converter and the second mode converter are configured to generate a near-field with a first profile, responsive to the first mode converter receiving a first input wave with a first mode number; and the first mode converter and the second mode converter are configured to generate a near-field with a second profile, responsive to the first mode converter receiving a second input wave with a second mode number.

\* \* \* \* \*